US012792386B2

(12) United States Patent
Yoshii et al.

(10) Patent No.: US 12,792,386 B2
(45) Date of Patent: Nov. 10, 2026

(54) STORAGE SYSTEM AND A METHOD FOR PROCESSING DATA THEREOF

(71) Applicant: Hitachi, Ltd., Tokyo (JP)

(72) Inventors: Yoshihiro Yoshii, Tokyo (JP); Tomohiro Yoshihara, Tokyo (JP); Takashi Nagao, Tokyo (JP); Ryosuke Tatsumi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 413 days.

(21) Appl. No.: 18/603,265

(22) Filed: Mar. 13, 2024

(65) Prior Publication Data

US 2024/0427624 A1 Dec. 26, 2024

(30) Foreign Application Priority Data

Jun. 21, 2023 (JP) ................................ 2023-101392

(51) Int. Cl.

*G06F 9/45* (2006.01)
*G06F 9/455* (2018.01)
*G06F 12/02* (2006.01)

(52) U.S. Cl.

CPC ...... *G06F 9/45558* (2013.01); *G06F 12/0246* (2013.01); *G06F 2009/45583* (2013.01)

(58) Field of Classification Search

CPC ....... G06F 9/45558; G06F 2009/45583; G06F 12/0246
USPC ............................................................. 718/1
See application file for complete search history.

(56) References Cited

U.S. PATENT DOCUMENTS 7,343,449 B2 * 3/2008 Arai .................... G06F 11/1456 714/E11.12
7,461,196 B2 * 12/2008 Kawamura ............. G06F 3/067 711/2
10,817,209 B2 10/2020 Matsushita et al.
11,175,984 B1 * 11/2021 Lercari ................. G06F 11/108
(Continued)

FOREIGN PATENT DOCUMENTS

JP 2022-26812 A 2/2022
JP 2022-187521 U 11/2022

OTHER PUBLICATIONS

U.S. Appl. No. 18/119,162, filed Mar. 8, 2023.

*Primary Examiner* — Tuan C Dao
(74) *Attorney, Agent, or Firm* — Mattingly & Malur, PC

(57) ABSTRACT

The present invention achieves high throughput by making efficient use of virtual device resources. A storage system includes a storage device and a processor. The processor manages a primary volume and a snapshot volume as a snapshot family. The processor uses a snapshot virtual device as the data storage destination for the primary volume and for the snapshot volume. Upon receiving a write request from a host, the processor switches between an overwrite process and a new allocation process in accordance with the reference made to a write destination address range by the snapshot volume and with the degree of distribution of the write destination address range in the snapshot virtual device. The overwrite process is performed to overwrite an allocated area of the snapshot virtual device. The new allocation process is performed to allocate a new area of the snapshot virtual device to the write destination address range.

8 Claims, 27 Drawing Sheets

(56) References Cited

U.S. PATENT DOCUMENTS

| | | | | |
|---|---|---|---|---|
| 2010/0242039 | A1* | 9/2010 | Noguchi | G06F 13/102 718/1 |
| 2013/0212345 | A1* | 8/2013 | Nakajima | G06F 3/0605 711/161 |
| 2016/0179432 | A1* | 6/2016 | Niwa | G06F 3/0638 711/203 |
| 2020/0401348 | A1* | 12/2020 | Satoyama | G06F 11/1451 |
| 2021/0311900 | A1* | 10/2021 | Malladi | G06F 13/4027 |
| 2021/0373951 | A1* | 12/2021 | Malladi | G06F 9/505 |
| 2022/0035833 | A1 | 2/2022 | Matsushita et al. | |

* cited by examiner

FIG. 8

OWNERSHIP MANAGEMENT TABLE
1001

| VOL#/VDEV# (1201) | OWNER CPU# (1202) |
|---|---|
| 0x0000 | 0 |
| 0x00f0 | 1 |
| ... | ... |

FIG. 9

CR-VDEV MANAGEMENT TABLE
1002

| VDEV# (1301) | CR-VDEV# (1302) |
|---|---|
| 0x0000 | 0x0100 |
| 0x00f0 | 0x0f90 |
| ... | ... |

FIG. 10

SNAPSHOT MANAGEMENT TABLE
1003

| PVOL# (1401) | SVOL# (1402) | ACQUISITION TIME (1403) |
|---|---|---|
| 0 | 0x010 | t0 |
| 0 | 0x020 | t1 |
| 0 | 0x030 | t2 |
| 0 | 0x040 | t3 |
| ... | ... | ... |

FIG. 11

VOL-DIR MANAGEMENT TABLE
1004

| | VOL# (1501) | ROOT-VOL# (1502) | DIR-INFO# (1503) |
|---|---|---|---|
| PVOL# | 0x0000 | 0x0000 | 0x0000 |
| PVOL# | 0x0001 | 0x0001 | 0x0005 |
| PVOL# | ... | ... | ... |
| SVOL# | 0x0010 | 0x0000 | 0x0001 |
| SVOL# | 0x0020 | 0x0000 | 0x0002 |
| SVOL# | ... | ... | ... |

FIG. 12

LATEST GENERATION TABLE
1005

| LATEST GENERATION # |
| --- |
| 100 |

FIG. 13

COLLECTION MANAGEMENT TABLE
1006

| DIR-INFO# (1701) | COLLECTION REQUEST (1702) |
| --- | --- |
| 0x0000 | 0 |
| 0x0001 | 1 |
| ... | ... |
| 0xFFFF | 0 |

GENERATION MANAGEMENT TREE TABLE
1007

1801 1802 1803 1804A 1804B

| DIR-INFO# | GENERATION # | PREV | NEXT-A | NEXT-B |
|---|---|---|---|---|
| 0x0000 | 3 | 0x0001 | – | – |
| 0x0001 | 1 | 0x0003 | 0x0002 | 0x0000 |
| 0x0002 | 2 | 0x0001 | – | – |
| 0x0003 | 0 | – | 0x0001 | – |
| ... | ... | | | |
| 0xFFFF | – | | | |

SNAPSHOT ALLOCATION MANAGEMENT TABLE
1008

1901 1902 1903 1904

| BLOCK ADDRESS | STATUS | ALLOCATION DESTINATION VOL # | ALLOCATION DESTINATION ADDRESS |
|---|---|---|---|
| 0 | 1 | 0x0001 | 0 |
| 1 | 0 | n/a | n/a |
| 2 | 1 | 0x0010 | 100 |
| 3 | 0 | n/a | n/a |
| 4 | 1 | 0x0020 | 100 |
| ... | ... | ... | ... |

FIG. 16

DIR MANAGEMENT TABLE
1009

| VOL/VDEV ADDRESS (2001) | REFERENCE DESTINATION MAPPING-INFO # (2002) |
|---|---|
| 0x00000000 | 0 |
| 0x00000200 | 1 |
| 0x00000400 | 2 |
| ... | ... |

FIG. 17

SS-MAPPING MANAGEMENT TABLE
1010

| MAPPING-INFO # (2101) | REFERENCE DESTINATION ADDRESS (2102) | REFERENCE DESTINATION SS-VDEV # (2103) | GENERATION # (2104) |
|---|---|---|---|
| 0 | 2 | 0x10 | 2 |
| 1 | 5 | 0x10 | 3 |
| 2 | 10 | 0x10 | 1 |
| ... | ... | ... | ... |

FIG. 18

COMPRESSION ALLOCATION MANAGEMENT TABLE
1011

| SUB-BLOCK ADDRESS (2201) | DATA LENGTH (2202) | STATUS (2203) | FIRST SUB-BLOCK ADDRESS (2204) | ALLOCATION DESTINATION VDEV # (2205) | ALLOCATION DESTINATION ADDRESS (2206) |
|---|---|---|---|---|---|
| 0 | 2 | 1 | 0 | 0x0010 | 0 |
| 1 | – | 1 | 0 | n/a | n/a |
| 2 | 1 | 2 | 2 | 0x010 | 100 |
| 3 | 1 | 1 | 3 | 0x010 | 100 |
| 4 | – | 0 | – | n/a | n/a |
| ... | ... | ... | ... | ... | ... |

FIG. 19

CR-MAPPING MANAGEMENT TABLE
1012

| MAPPING-INFO # (2301) | REFERENCE DESTINATION ADDRESS (2302) | REFERENCE DESTINATION CR-VDEV # (2303) | DATA LENGTH (2304) |
|---|---|---|---|
| 0 | 2 | 0x1010 | 2 |
| 1 | 5 | 0x1010 | 3 |
| 2 | 10 | 0x1010 | 1 |
| ... | ... | ... | ... |

FIG. 20

DEDUP-DIR MANAGEMENT TABLE
1013

| DEDUP-VDEV ADDRESS (2401) | REFERENCE DESTINATION ALLOCATION INFORMATION # (2402) |
|---|---|
| 0 | 0 |
| 1 | 1 |
| ... | ... |

FIG. 21

DEDUP ALLOCATION MANAGEMENT TABLE
1014

| ALLOCATION INFORMATION # (2501) | ALLOCATION DESTINATION SS-VDEV # (2502) | ALLOCATION DESTINATION ADDRESS (2503) | LINKED ALLOCATION INFORMATION # (2504) |
|---|---|---|---|
| 0 | 0x0010 | 0 | 2 |
| 1 | 0x0010 | 1 | 3 |
| 2 | 0x0020 | 100 | 14 |
| 3 | 0x0020 | 200 | – |
| ... | ... | ... | ... |

FIG. 22

POOL-MAPPING MANAGEMENT TABLE
1015

| VDEV ADDRESS (2601) | PAGE# (2602) |
|---|---|
| 0x00000000 | 2 |
| 0x00000200 | 5 |
| 0x00000400 | 10 |
| ... | ... |

FIG. 23

POOL ALLOCATION MANAGEMENT TABLE
1016

| PAGE# (2701) | RG# (2702) | START ADDRESS (2703) | STATUS (2704) | ALLOCATION DESTINATION VDEV # (2705) | ALLOCATION DESTINATION ADDRESS (2706) |
|---|---|---|---|---|---|
| 0 | 0 | 0 | 1 | 0x1010 | 0 |
| 1 | 0 | 100 | 0 | n/a | n/a |
| 2 | 0 | 200 | 1 | 0x1020 | 100 |
| 3 | 1 | 0 | 0 | n/a | n/a |
| 4 | 1 | 100 | 1 | 0x1010 | 100 |
| ... | ... | ... | ... | ... | ... |

STORAGE SYSTEM AND A METHOD FOR PROCESSING DATA THEREOF

CROSS-REFERENCE TO RELATED APPLICATION

The present application claims priority from Japanese application JP2023-101392, filed on Jun. 21, 2023, the content of which is hereby incorporated by reference into this application.

BACKGROUND

The present invention relates to a storage system and a data processing method.

In recent years, the need for data utilization has increased, and opportunities for data duplication have increased. As a result, the snapshot function is becoming increasingly important in storage systems. Conventionally, a typical means for implementing the snapshot function is the Redirect on Write (RoW) method. The RoW method is at an advantage in that the impact on I/O performance during snapshot creation is small because it involves no copying of data or meta information. The RoW method is often adopted in AFA (All Flash Array) devices. The RoW method is a method for rewriting data. The method for rewriting is a data storage method that writes write target data into a storage system by storing the write target data in a new area without overwriting previously stored data and rewrites meta information so as to reference the data stored in the new area.

In a case where the data storage method based on rewriting is used, free areas tend to become fragmented if a write from a host computer is repeatedly processed. When fragmentation progresses, data of a requested size cannot be allocated to contiguous areas. This causes a problem in which read and write performance degrades over time. Fragmentation can be reduced by performing a garbage collection process for changing the arrangement of data. However, this process has a particularly significant impact on performance.

Presented in U.S. Pat. No. 10,817,209 is a method that increases the efficiency of the garbage collection process by allocating data shared by a plurality of volumes through deduplication and snapshots to a virtual space different from the storage destination for individual data referenced by only one volume and thus decreasing the number of references to duplicate data.

SUMMARY

However, adding a virtual device space as described in U.S. Pat. No. 10,817,209 increases the amount of mapping information to be referenced and updated during read/write IO processing. This causes a problem in which the load on a storage controller increases to reduce throughput. Further, the allocation of the virtual device space increases the amount of metadata with respect to the amount of data to be stored. This causes a problem of lessening the effect of reduction or limiting the number of creatable volumes due to an insufficient number of virtual device resources. However, no solutions are proposed for these problems.

In view of the above circumstances, the present invention has an object of achieving high throughput by making efficient use of the virtual device resources.

In order to achieve the above object, a typical storage system provided by the present invention includes a storage device and a processor that accesses the storage device. The processor manages a primary volume and a snapshot volume as a snapshot family. The primary volume is handled as a read/write target of a host. The snapshot volume is generated from the primary volume. The processor uses a snapshot virtual device, which provides a logical address space associated with the snapshot family, as the data storage destination for the primary volume and for the snapshot volume. Upon receiving a write request from the host, the processor switches between an overwrite process and a new allocation process in accordance with the reference made to a write destination address range by the snapshot volume and with the degree of distribution of the write destination address range in the snapshot virtual device. The overwrite process is performed to overwrite an allocated area of the snapshot virtual device. The new allocation process is performed to allocate a new area of the snapshot virtual device to the write destination address range.

In addition, a typical data processing method provided by the present invention is a data processing method adopted by a storage system that includes a storage device and a processor. The processor accesses the storage device. The processor manages a primary volume and a snapshot volume as a snapshot family. The primary volume is handled as a read/write target of a host. The snapshot volume is generated from the primary volume. The processor uses a snapshot virtual device as the data storage destination for the primary volume and for the snapshot volume. The snapshot virtual device provides a logical address space associated with the snapshot family. Upon receiving a write request from the host, the processor switches between an overwrite process and a new allocation process in accordance with the reference made to a write destination address range by the snapshot volume and with the degree of distribution of the write destination address range in the snapshot virtual device. The overwrite process is performed to overwrite an allocated area of the snapshot virtual device. The new allocation process is performed to allocate a new area of the snapshot virtual device to the write destination address range.

The present invention makes it possible to achieve high throughput by making efficient use of the virtual device resources. Objects, configurations, and advantages other than those described above will become apparent from the following description of embodiments.

BRIEF DESCRIPTION OF THE DRAWINGS

FIG. 8 illustrates a configuration of an ownership management table;

FIG. 9 illustrates a configuration of a CR-VDEV management table;

FIG. 10 illustrates a configuration of a snapshot management table;

FIG. 11 illustrates a configuration of a VOL-Dir management table;

FIG. 12 illustrates a configuration of a latest generation table;

FIG. 13 illustrates a configuration of a collection management table;

FIG. 16 illustrates a configuration of a Dir management table;

FIG. 17 illustrates a configuration of an SS-Mapping management table;

FIG. 18 illustrates a configuration of a compression allocation management table;

FIG. 19 illustrates a configuration of a CR-Mapping management table;

FIG. 20 illustrates a configuration of a Dedup-Dir management table;

FIG. 21 illustrates a configuration of a Dedup allocation management table;

FIG. 22 illustrates a configuration of a Pool-Mapping management table;

FIG. 23 illustrates a configuration of a Pool allocation management table;

DETAILED DESCRIPTION

Embodiments of the present invention will now be described with reference to the accompanying drawings.

First Embodiment

Figure 1:
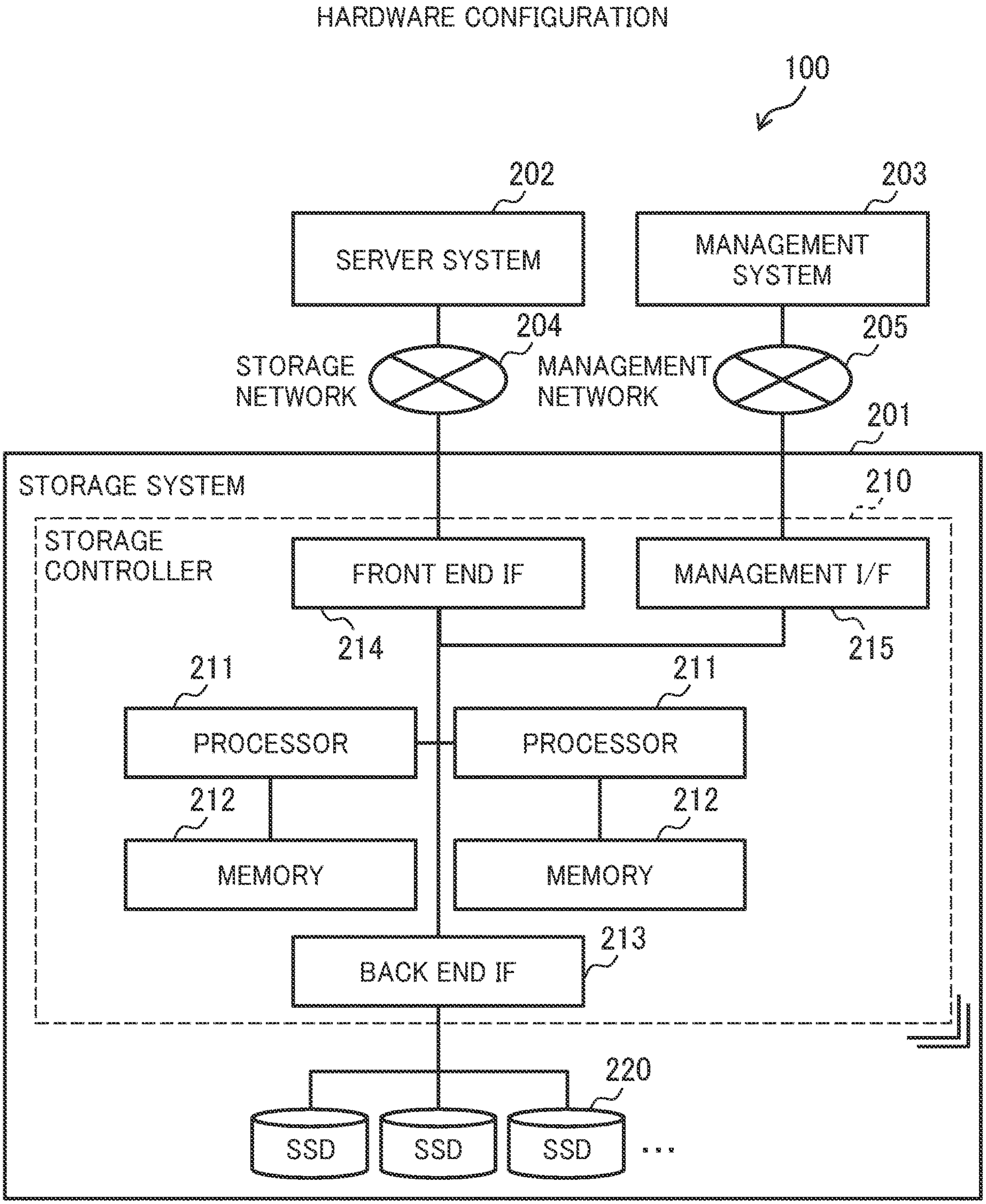
FIG. 1 is a block diagram illustrating a hardware configuration of a storage system provided by the present invention.

FIG. 1 illustrates a hardware configuration of a computer system.

The computer system 100 includes a storage system 201, a server system 202, and a management system 203. The storage system 201 and the server system 202 are connected through a storage network 204 that uses, for example, a fiber channel (FC). The storage system 201 and the management system 203 are connected through a management network 205 that uses, for example, an internet protocol (IP). It should be noted that the storage network 204 and the management network 205 may be the same communication networks.

The storage system 201 includes a plurality of storage controllers 210 and a plurality of SSDs 220. The storage controllers 210 are each connected to the plurality of SSDs 220. The plurality of SSDs 220 serve as an example of persistent storage devices. A pool 13 is formed based on the plurality of SSDs 220. Data stored in a page 14 of the pool 13 is stored on one or more SSDs 220.

The storage controllers 210 each include a CPU 211, a memory 212, a back-end interface 213, a front-end interface 214, and a management interface 215.

The CPU 211 executes programs stored in the memory 212.

The memory 212 stores, for example, the programs to be executed by the CPU 211 and data to be used by the CPU 211. A set of the memory 212 and CPU 211 may be used to provide duplexed memory.

The back-end interface 213, the front-end interface 214, and the management interface 215 are examples of interface devices.

The back-end interface 213 is a communication interface that mediates data exchange between the SSDs 220 and the storage controllers 210. The back-end interface 213 is connected to the plurality of SSDs 220.

The front-end interface 214 is a communication interface that mediates data exchange between the server system 202 and the storage controllers 210. The front-end interface 214 is connected to the server system 202 through the storage network 204.

The management interface 215 is a communication interface that mediates data exchange between the management system 203 and the storage controllers 210. The management interface 215 is connected to the management system 203 through the management network 205.

The server system 202 includes one or more host devices. The server system 202 transmits an I/O request (a write request or a read request) specifying an I/O destination to the storage controllers 210. The I/O destination is, for example, a logical volume number such as a logical unit number (LUN) or a logical address such as a logical block address (LBA).

The management system 203 includes one or more management devices. The management system 203 manages the storage system 201.

Figure 2:
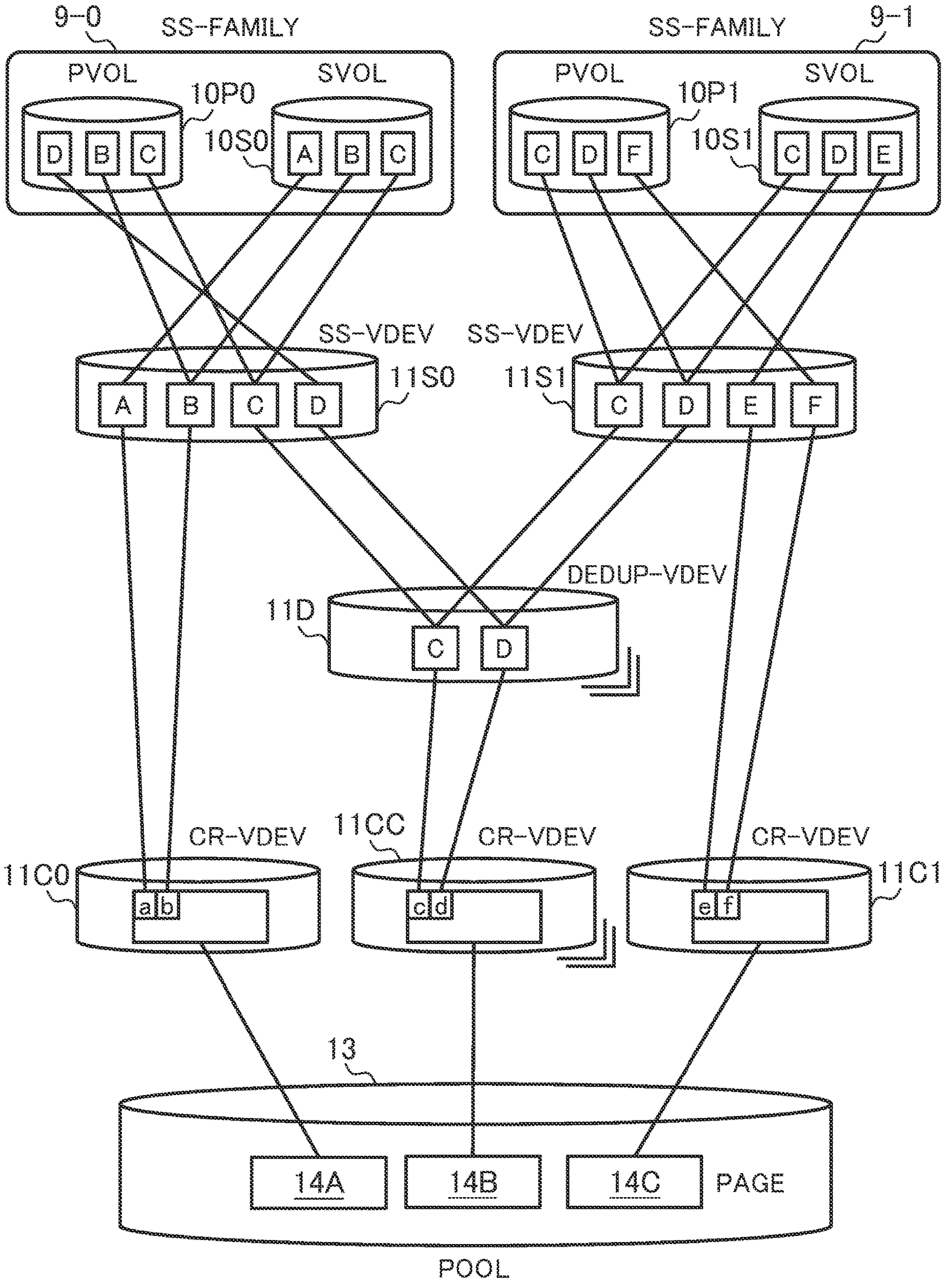
FIG. 2 is a schematic diagram illustrating how storage control is exercised by the storage system provided by the present invention.

FIG. 2 illustrates an overview of storage control provided by the storage system. Referring to FIG. 2, the data indicated by uppercase alphabet letters (data A, B, C, . . . ) is block data, and the data indicated by lowercase alphabet letters (data a, b, c, . . . ) is sub-block data. The block data may be data in units of blocks. The blocks may be fixed-length logical storage areas (logical address range). The sub-block data is compressed data of block data, and is to be stored in a sub-block group (one or more sub-blocks). The sub-blocks may be logical storage areas that are smaller in size than the blocks. For example, the blocks may be integer multiples of the sub-blocks.

The storage system, which has a storage device and a processor, includes an SS-family (snapshot family) 9, an SS-VDEV (snapshot virtual device) 11S, a Dedup-VDEV (deduplication virtual device) 11D, a CR-VDEV (compression append virtual device) 11C, and the pool 13.

The SS-family 9 is a volume group that includes a PVOL 10P and an SVOL 10S. The SVOL 10S is a snapshot of the PVOL 10P.

The SS-VDEV 11S is a virtual device serving as a logical address space and used as the storage destination for data to be stored in one of the VOLs (volumes) 10 in the SS-family 9.

The Dedup-VDEV 11D is a virtual device serving as a logical address space separate from the SS-VDEV 11S, and used as the storage destination for duplicate data in two or more SS-VDEVs 11S.

The CR-VDEV 11C is a virtual device serving as a logical address space separate from the SS-VDEV 11S and Dedup-VDEV 11D, and is used as a storage destination for compressed data.

Each of a plurality of CR-VDEVs 11C is associated with either the SS-VDEV 11S or the Dedup-VDEV 11D, and is not associated with both of the SS-VDEV 11S and the Dedup-VDEV 11D. That is to say, each CR-VDEV 11C serves as a storage destination for data to be stored in a VDEV (virtual device) corresponding to the CR-VDEV 11C, and does not serve as a storage destination for data to be stored in a VDEV that does not correspond to the CR-VDEV 11C. The compressed data whose storage destination is the CR-VDEV 11C is to be stored in the pool 13.

The pool 13 is a logical address space based on at least a portion of the storage device (e.g., persistent storage device) included in the storage system. The pool 13 may be based on at least a portion of an external storage device (e.g., persistent storage device) of the storage system instead of or in addition to at least some of the storage devices included in the storage system. The pool 13 has a plurality of pages 14 that serve as a plurality of logical areas. The compressed data whose storage destination is the CR-VDEV 11C is to be stored in the page 14 in the pool 13. The mapping between addresses in the CR-VDEV 11C and addresses in the pool 13 is 1:1. The pool 13 includes one or more pool VOLs (volumes).

According to the example depicted in FIG. 2, the following storage control is performed.

The processor creates an SVOL 10S0 as a snapshot of a PVOL 10P0, thereby creating an SS-family 9-0 that uses the PVOL 10P0 as a root VOL (volume). Further, the processor creates an SVOL 10S1 as a snapshot of a PVOL 10P1, thereby creating an SS-family 9-1 that uses the PVOL 10P1 as the root VOL (volume). According to FIG. 2, the SS-families 9-0, 9-1 are examples of a plurality of SS-families.

The storage system has one or more SS-VDEVs 11S for each of the plurality of SS-families 9. For each SS-family 9, data whose storage destination is any one of the VOLs (volumes) 10 in the SS-family 9 is to be stored in one of the plurality of SS-VDEVs 11S that corresponds to the SS-family 9. More specifically, in the case, for example, of the SS-family 9-0, the following operations are performed.

The processor sets an SS-VDEV 11S0 as the storage destination for data A that is to be stored in the SVOL 10S0 of the SS-family 9-0. The processor maps an address corresponding to data A in the SVOL 10S0 to an address corresponding to data A in the SS-VDEV 11S0 corresponding to the SS-family 9-0.

If identical data B exists in a plurality of volumes (PVOL 10P0 and SVOL 10S0) of the SS-family 9-0, the processor maps a plurality of addresses of the identical data B among the plurality of the VOLs (volumes) 10 (an address in the PVOL 10P0 and an address in the SVOL 10S0) to an address of the SS-VDEV 11S0 of the SS-family 9-0 (an address corresponding to data B).

For each of the SS-families 9-0, 9-1 (an example of two or more SS-families 9), the storage destination for non-duplicate data is set to the CR-VDEV 11C corresponding to the SS-family 9, and the storage destination for duplicate data is set to the Dedup-VDEV 11D.

That is to say, since data C is duplicated in SS-VDEVs 11S0, 11S1 of the SS-families 9-0, 9-1 (an example of two or more SS-VDEVs 11S), the processor maps two addresses of the duplicate data C in the SS-VDEVs 11S0, 11S1 to an address corresponding to the duplicate data C in the Dedup-VDEV 11D. Then, the processor compresses the duplicate data C and sets the storage destination for the compressed data c to a CR-VDEV 11CC corresponding to the Dedup-VDEV 11D. That is to say, the processor maps the address (block address) of the duplicate data C in the Dedup-VDEV 11D to the address (sub-block address) of the compressed data c in the CR-VDEV 11CC. Further, the processor allocates a page 14B to the CR-VDEV 11CC and stores the compressed data c in the page 14B. The address of the compressed data c in the CR-VDEV 11CC is mapped to an address in the page 14B of the pool 13.

Meanwhile, data A for the SS-VDEV 11S0 is not a duplicate of the data in other SS-VDEV 11S1. Therefore, the processor compresses the non-duplicate data A and sets the compressed data a in a CR-VDEV 11C0 corresponding to the SS-VDEV 11S0. That is to say, the processor maps the address (block address) of the non-duplicate data A in the SS-VDEV 11S0 to the address (sub-block address) of the compressed data a in the CR-VDEV 11CC. Further, the processor allocates a page 14A to the CR-VDEV 11CC and stores the compressed data a in the page 14A. The address of the compressed data a in the CR-VDEV 11C0 is mapped to an address in the page 14A of the pool 13.

The CR-VDEV 11C is an append-type virtual device. For this reason, the processor updates address mapping in a case where the storage destination for update data is the CR-VDEV 11C corresponding to the SS-VDEV 11S or in a case where the storage destination for the update data is the CR-VDEV 11C corresponding to the Dedup-VDEV 11D. More specifically, the processor performs, for example, the following storage control.

In a case where the storage target for the CR-VDEV 11C0 is update data a' for compressed data a, the processor sets the storage destination for the update data a' to an empty address in the CR-VDEV 11C0, and invalidates the address of the unupdated compressed data a. The processor replaces the address mapped to the address of the compressed data a, which is an address in the SS-VDEV 11S0, with the address of the compressed data a in the CR-VDEV 11C0, and maps the resulting address to the storage destination address of the update data a' in the CR-VDEV 11C0. Further, the processor replaces the address mapped to the address of the compressed data a, which is an address in the page 14A, with the address of the compressed data a in the CR-VDEV 11C0, and maps the resulting address to the storage destination address of the update data a' in the CR-VDEV 11C0.

In a case where the storage target for the CR-VDEV 11CC is the update data c' for the compressed data c, the processor sets the storage destination for the update data c' to an empty address in the CR-VDEV 11CC, and invalidates the address of the unupdated compressed data c. The processor replaces the address mapped to the address of the compressed data c, which is an address in the Dedup-VDEV 11D, with the address of the compressed data c in the CR-VDEV 11CC, and maps the resulting address to the storage destination address of the update data c' in the CR-VDEV 11CC. Further, the processor replaces the address mapped to the address of the compressed data c, which is an address in the page 14B, with the address of the compressed data a in the CR-VDEV 11CC, and maps the resulting address to the storage destination address of the update data c' in the CR-VDEV 11CC.

The CR-VDEV 11C is an append-type virtual device described above, and configured to perform garbage collection. That is to say, by performing garbage collection on the CR-VDEV 11C, the processor is able to ensure that valid addresses (addresses of the latest data) are continuous, and that addresses of free areas are continuous.

According to the example depicted in FIG. 2, in addition to the SS-VDEV 11S, which is the storage destination for data in the SS-family 9, the Dedup-VDEV 11D is prepared as the storage destination for duplicate data in two or more SS-families 9. Therefore, even if the address of the duplicate data C in the Dedup-VDEV 11D is changed, the address mapping for such address change is completed by two mappings (one for each of two addresses in the SS-VDEVs 11S0, 11S1). Meanwhile, in a comparative example, the same virtual device serves as the storage destination for data in the SS-family 9 and as the storage destination for duplicate data in two or more SS-families 9. In this case, four mappings are to be performed for change required for the duplicate data C (mapping for each of four addresses in the VOLs (volumes) 10P0, 10S0, 10P1, 10S1). It is expected that the present embodiment changes the address mapping within a shorter period of time than in the comparative example.

Separately from the Dedup-VDEV 11D, the CR-VDEV 11CC is prepared for the Dedup-VDEV 11D. Therefore, even if the address of the compressed data c in the CR-VDEV 11CC is changed, the address mapping for such address change is completed by only one mapping (the mapping for one address in the Dedup-VDEV 11D). Meanwhile, in a comparative example, the same virtual device serves as the storage destination for the compressed data of data in the SS-family 9 and as the storage destination for the compressed data of duplicate data in two or more SS-families 9. In this case, four mappings are to be performed for change required for the compressed data c of the duplicate data C (mapping for each of four addresses in the VOLs 10P0, 10S0, 10P1, 10S1). It is expected that the present embodiment changes the address mapping within a shorter period of time than in the comparative example.

The address of the compressed data c is changed during garbage collection on the CR-VDEV 11CC corresponding to the Dedup-VDEV 11D. For example, during the garbage collection on the CR-VDEV 11CC, the processor changes the address of the update data c' (update data for the compressed data c) in the CR-VDEV 11CC, and maps the resulting address, which is previously mapped to the pre-change address and is an address in the Dedup-VDEV 11D, to the changed address in the CR-VDEV 11CC. Since it is expected that the address mapping for compressed data of duplicate data will be changed within a short period of time, it is expected that the garbage collection will be performed within a short period of time. It should be noted that the garbage collection on the CR-VDEV 11C corresponding to the SS-VDEV 11S includes, for example, the following process. Specifically, the processor changes the address of the update data a' (the update data for the compressed data a) in the CR-VDEV 11C0, and maps the resulting address, which is previously mapped to the pre-change address and is an address in the SS-VDEV 11S0, to the changed address in the CR-VDEV 11C0.

For at least one CR-VDEV 11C, an append-type virtual device for storing uncompressed data may be adopted in place of the CR-VDEV 11C. However, in the present embodiment, the CR-VDEV 11C is adopted as the writable virtual device. Therefore, the data finally stored in the storage device is compressed data. This makes it possible to reduce the amount of memory consumption.

Figure 3:
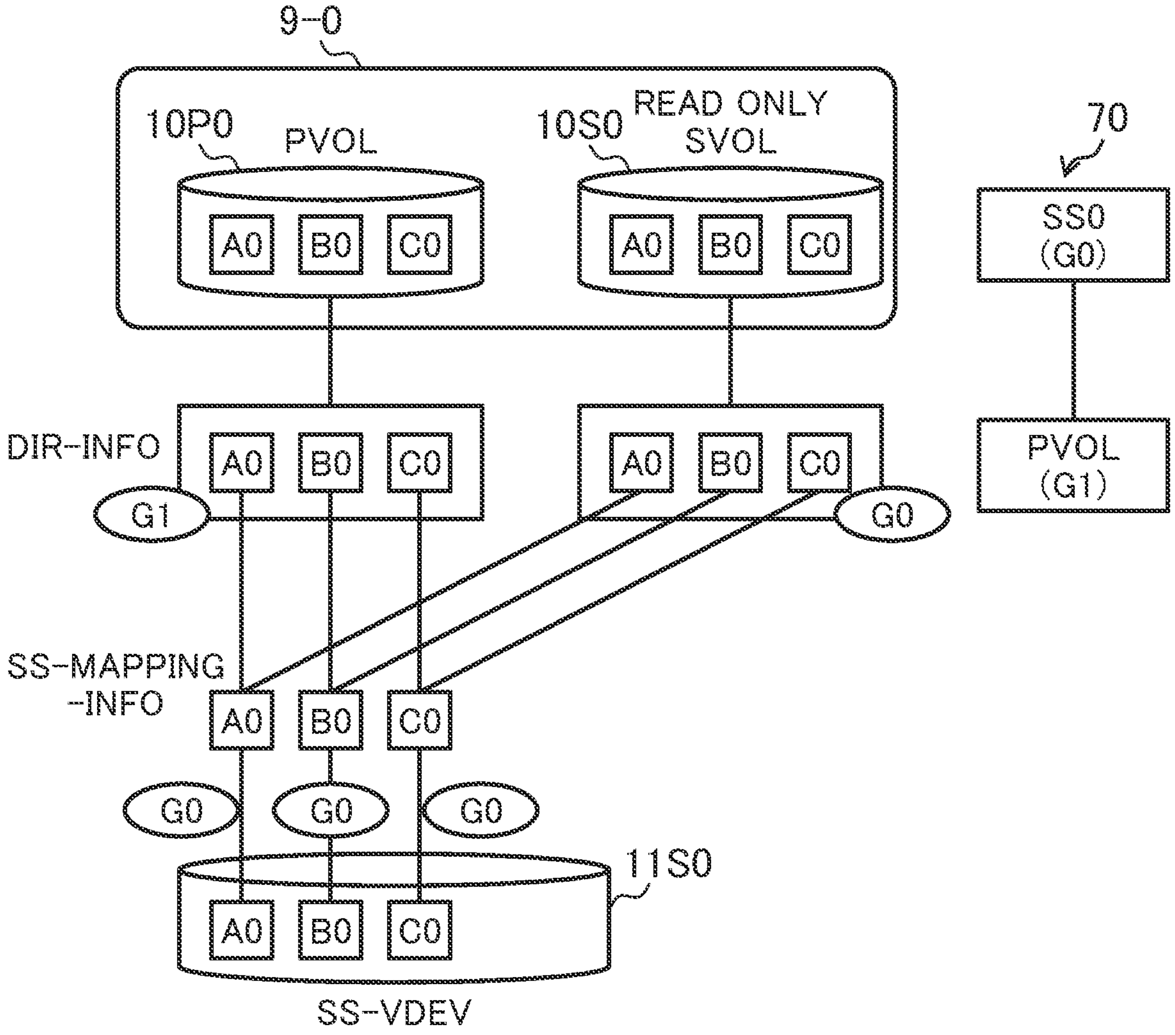
FIG. 3 is a schematic diagram illustrating how the mapping between SS-family addresses and SS-VDEV addresses is managed.

FIG. 3 schematically illustrates how the address mapping between the SS-family 9 and the SS-VDEV 11S is managed. It should be noted that "GX" (X is an integer of 0 or greater) in the drawings denotes generation X. Further, FIG. 3 depicts the SS-family 9-0 and the SS-VDEV 11S0 as examples.

The processor is able to manage the mapping between the addresses in the VOLs (volumes) 10 in the SS-family 9-C and the addresses in the SS-VDEV 11S0 by using meta information. The meta information includes Dir-Info (directory information) and SS-Mapping-Info (snapshot mapping information). The processor manages the data in the PVOL 10P0 and in the SVOL 10S0 by associating the Dir-Info with the SS-Mapping-Info. For data whose storage destination is a volume VOL10, the Dir-Info includes information indicating a reference source address (an address in the volume VOL10), and the SS-Mapping-Info corresponding to the data includes information indicating a reference destination address (an address in the SS-VDEV 11S0).

Furthermore, the processor manages the time series of the PVOL 10P0 and SVOL 10S0 by using generation information associated with the Dir-Info, and manages each data whose storage destination is the SS-VDEV 11S0 by defining the association between the SS-Mapping-Info and the generation information indicating the generation in which the data was created. In addition, the processor manages the current latest generation information as the information indicating the latest generation.

Let us now assume that, before snapshot acquisition, there are data A0, B0, C0 whose storage destination is the PVOL 10P0. Let us also assume that the latest generation is "0."

The Dir-Info associated with the PVOL 10P0 is associated with "0" as the generation # (the number representing the generation), and includes reference information indicating the reference destinations of all data A0, B0, C0 of the PVOL 10P0. Hereinafter, when the generation # associated with the Dir-Info is "X," it can be expressed that the Dir-Info is of generation X.

The SS-VDEV 11S0 is regarded as the storage destination for the data A0, B0, C0, and the SS-Mapping-Info is associated with each of the data A0, B0, C0. Further, each SS-Mapping-Info is associated with "0" as the generation #. When the generation # associated with the SS-Mapping-Info represents "X," the data corresponding to the SS-Mapping-Info can be expressed as data of generation X.

In a state before snapshot acquisition, the information serving as the Dir-Info for each of data A0, B0, C0 refers to the SS-Mapping-Info corresponding to the data. By associating the Dir-Info with the SS-Mapping-Info in the above-described manner, the PVOL 10P0 and the SS-VDEV 11S0 can be made corresponding to each other. As a result, data processing can be implemented with respect to the PVOL 10P0.

In order to acquire a snapshot, the processor makes a duplicate of the Dir-Info as the Dir-Info regarding the read-only SVOL 10S0. Then, the processor increments the generation of the Dir-Info regarding the PVOL 10P0, and additionally increments the latest generation. Consequently, as regards each of data A0, B0, C0, the SS-Mapping-Info is referenced by both the Dir-Info of generation 0 and the Dir-Info of generation 1.

As described above, it is possible to create a snapshot by duplicating the Dir-Info, and it is possible to create a snapshot without increasing the data in the SS-VDEV 11S0 or the SS-Mapping-Info.

Here, when a snapshot is acquired, the snapshot (SVOL 10S) in which writing is prohibited and data is fixed at the time of acquisition is regarded as generation 0, and the PVOL 10P0 into which data can be written even after acquisition is regarded as generation 1. Generation 0 is "one generation older in a direct line" than generation 1, and is referred to as a "parent" for the sake of convenience. Similarly, generation 1 is "one generation newer in the direct line" than generation 0, and is referred to as a "child" for the sake of convenience. The storage system manages a parent-child generational relationship as a Dir-Info generation management tree 70. Further, the generation # of Dir-Info is the same as the generation # of a volume VOL10 corresponding to the Dir-Info. Furthermore, the generation # of SS-Mapping-Info is the oldest generation # among the generation # of one or more pieces of Dir-Info that references the SS-Mapping-Info.

Figure 4:
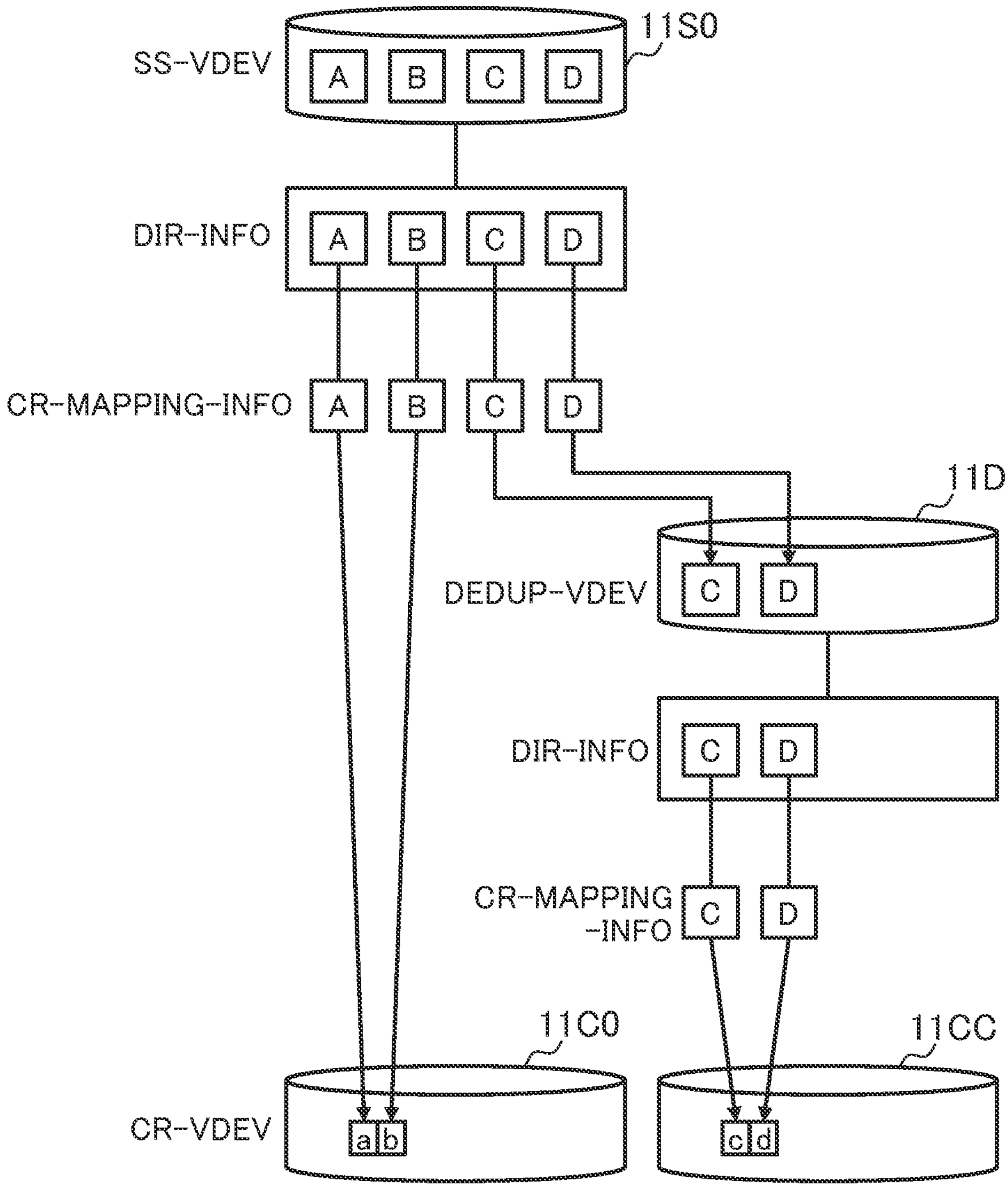
FIG. 4 is a schematic diagram illustrating the mapping management of SS-VDEV addresses and Dedup-VDEV addresses, the mapping management of SS-VDEV addresses and CR-VDEV addresses, and the mapping management of Dedup-VDEV addresses and CR-VDEV addresses.

FIG. 4 schematically illustrates the management of mapping between addresses in the SS-VDEV 11S and addresses in the Dedup-VDEV 11D, between addresses in the SS-VDEV 11S and addresses in the CR-VDEV 11C, and between addresses in the Dedup-VDEV 11D and addresses in the CR-VDEV 11C. FIG. 4 depicts the SS-VDEV 11S0, the CR-VDEV 11C0, 11CC as examples.

The processor is able to manage the mapping between the addresses in the SS-VDEV 11S0 and the addresses in the Dedup-VDEV 11D, between the addresses in the SS-VDEV 11S0 and the addresses in the CR-VDEV 11C0, and between the addresses in the Dedup-VDEV 11D and the addresses in the CR-VDEV 11CC by using the meta information. As described above, the meta information includes the Dir-Info and the CR-Mapping-Info. The processor manages the data in the SS-VDEV 11S0 and in the Dedup-VDEV 11D by associating the Dir-Info with the CR-Mapping-Info. As regards data whose storage destination is the SS-VDEV 11S0, the Dir-Info includes information indicating the reference source address (an address in the SS-VDEV 11S0), and the CR-Mapping-Info corresponding to the data includes information indicating the reference destination address (an address in the CR-VDEV 11C0 or in the Dedup-VDEV 11D). As regards data whose storage destination is the Dedup-VDEV 11D, the Dir-Info includes information indicating the reference source address (an address in the Dedup-VDEV 11D), and the CR-Mapping-Info corresponding to the data includes information indicating the reference destination address (an address in the CR-VDEV 11C). By referencing compression allocation information, the processor is able to specify the address in the SS-VDEV 11S or in the Dedup-VDEV 11D from an address in the CR-VDEV 11C.

Although not depicted in FIG. 4, in order to move valid data in the CR-VDEV to obtain contiguous free areas, the storage system 201 retains a compression allocation management table 1011 in the memory 212 as information regarding reverse mapping from an address in the CR-VDEV to an address in the SS-VDEV or in the Dedup-VDEV.

Figure 5:
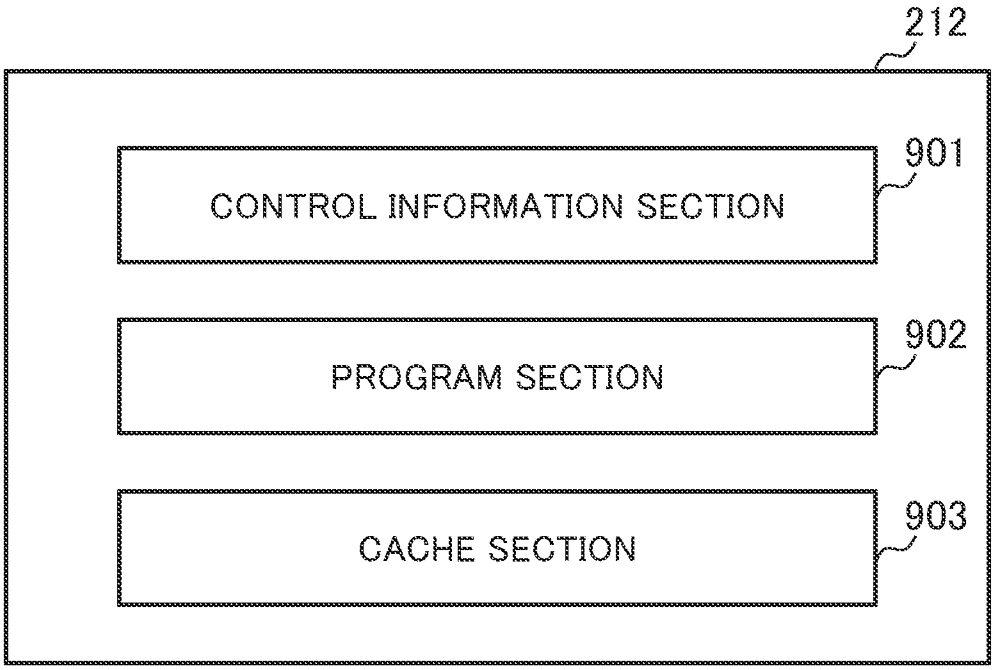
FIG. 5 is an explanatory diagram illustrating a configuration of a memory included in a storage controller provided by the present invention.

FIG. 5 illustrates a configuration of the memory 212. The memory 212 includes a control information section 901, a program section 902, and a cache section 903. The control information section 901 stores control information (referred to also as the management information). The program section 902 stores programs. The cache section 903 temporarily stores data.

Figure 6:
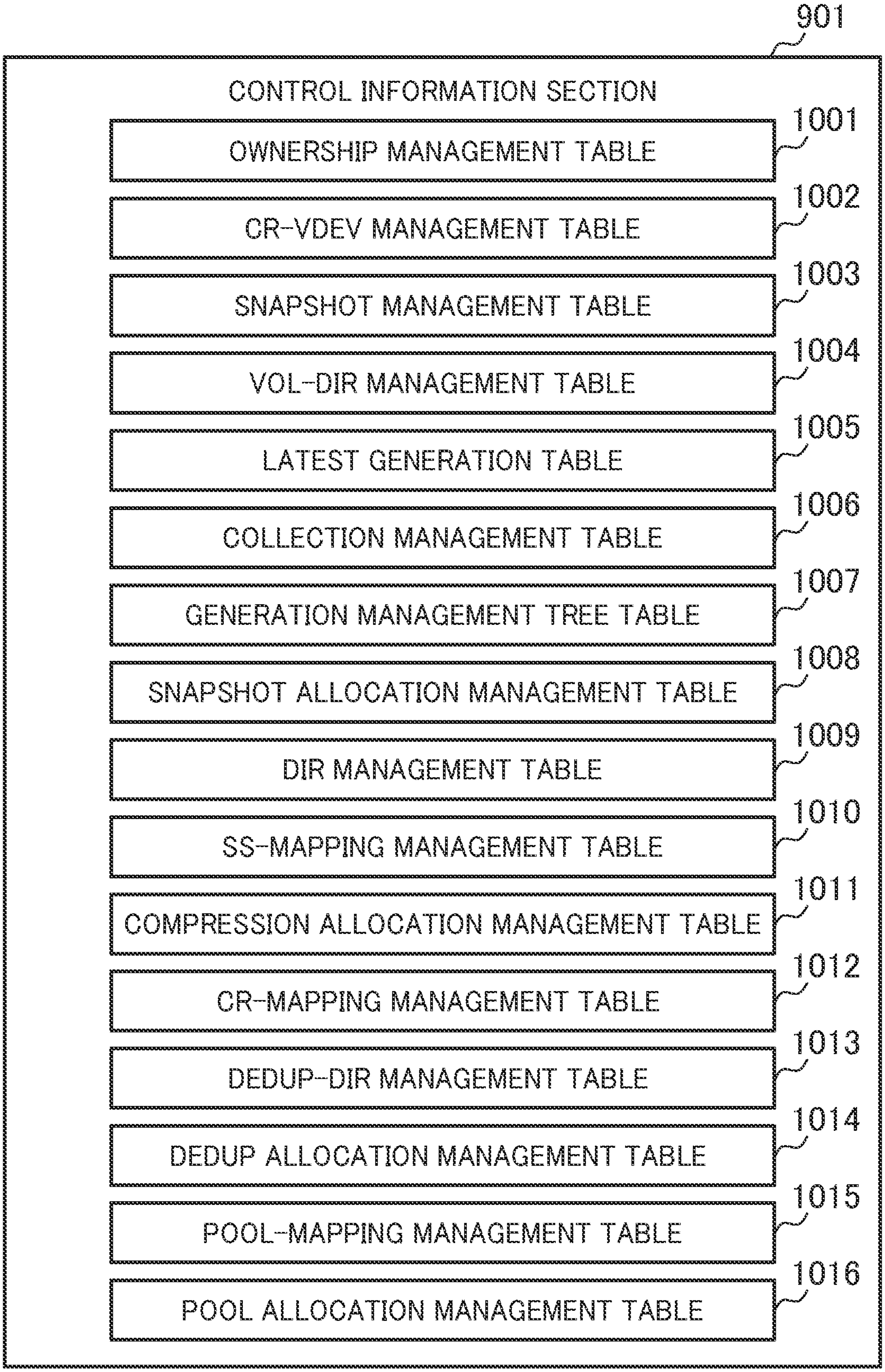
FIG. 6 is an explanatory diagram illustrating a configuration of a control information area of a memory of the storage controller provided by the present invention.

FIG. 6 illustrates information stored in the control information section 901.

The control information section 901 stores an ownership management table 1001, a CR-VDEV management table 1002, a snapshot management table 1003, a VOL-Dir management table 1004, a latest generation table 1005, a collection management table 1006, a generation management tree table 1007, a snapshot allocation management table 1008, a Dir management table 1009, an SS-Mapping management table 1010, a compression allocation management table 1011, a CR-Mapping management table 1012, a Dedup-Dir management table 1013, a Dedup allocation management table 1014, a Pool-Mapping management table 1015, and a Pool allocation management table 1016.

Figure 7:
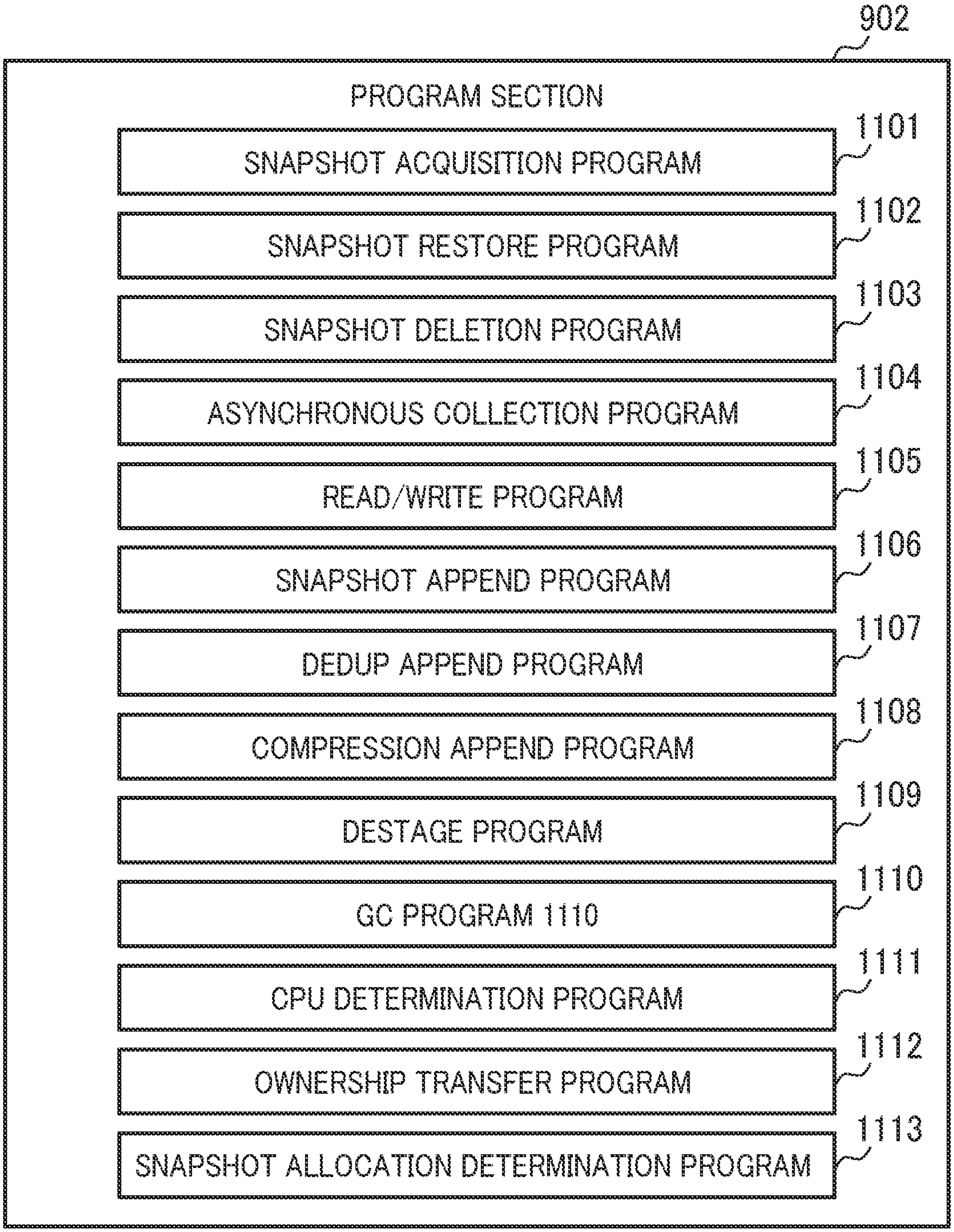
FIG. 7 is an explanatory diagram illustrating a configuration of a program area of the memory of the storage controller provided by the present invention.

FIG. 7 illustrates the programs stored in the program section 902.

The program section 902 stores a snapshot acquisition program 1101, a snapshot restore program 1102, a snapshot deletion program 1103, an asynchronous collection program 1104, a read/write program 1105, a snapshot append program 1106, a Dedup append program 1107, a compression append program 1108, a destage program 1109, a GC (garbage collection) program 1110, a CPU determination program 1111, an ownership transfer program 1112, and a snapshot allocation determination program 1113.

FIG. 8 illustrates a configuration of the ownership management table 1001.

The ownership management table 1001 manages the ownership of the VOLs (volumes) 10 or VDEVs (virtual devices) 11. For example, the ownership management table 1001 has an entry for each VOL 10 and each VDEV 11. The entry includes information such as a VOL #/VDEV #1201 and an owner CPU #1202.

The VOL #/VDEV #1201 represents the identification number of a VOL 10 or VDEV 11. The owner CPU #1202 represents the identification number of the CPU as the owner CPU of a VOL 10 or VDEV 11 (the CPU having the ownership of the VOL 10 or VDEV 11).

It should be noted that the owner CPU may be allocated to each CPU group or to each storage controller 210 instead of being allocated to each CPU 211.

FIG. 9 illustrates a configuration of the CR-VDEV management table 1002.

The CR-VDEV management table 1002 indicates the CR-VDEV 11C that is associated with the SS-VDEV 11S or with the Dedup-VDEV 11D. For example, the CR-VDEV management table 1002 has an entry for each SS-VDEV 11S and for each Dedup-VDEV 11D. The entry includes information such as a VDEV #1301 and a CR-VDEV #1302.

The VDEV #1301 represents the identification number of the SS-VDEV 11S or Dedup-VDEV 11D. The CR-VDEV #1302 represents the identification number of the CR-VDEV 11C.

FIG. 10 illustrates a configuration of the snapshot management table 1003.

The snapshot management table 1003 exists for each PVOL 10P (of each SS-Family 9). The snapshot management table 1003 indicates the time of acquisition of each snapshot (SVOL 10S). For example, the snapshot management table 1003 has an entry for each SVOL 10S. The entry includes information such as a PVOL #1401, an SVOL #1402, and an acquisition time 1403.

The PVOL #1401 represents the identification number of the PVOL 10P. The SVOL #1402 represents the identification number of the SVOL 10S. The acquisition time 1403 indicates the time of acquisition of the SVOL 10S.

FIG. 11 illustrates a configuration of the VOL-Dir management table 1004.

The VOL-Dir management table 1004 indicates the correspondence between the VOLs (volumes) and the Dir-Info. For example, the VOL-Dir management table 1004 has an entry for each VOL (volume) 10. The entry includes information such as a VOL #1501, a Root-VOL #1502, and a Dir-Info #1503.

The VOL #1501 represents the identification number of the PVOL 10P or SVOL 10S. The Root-VOL #1502 represents the identification number of a Root-VOL (root volume). If the VOL 10 is a PVOL 10P, the Root-VOL is the PVOL 10P. If the VOL 10 is an SVOL 10S, the Root-VOL is the PVOL 10P corresponding to the SVOL 10S. The Dir-Info #1503 represents the identification number of the Dir-Info corresponding to the VOL 10.

FIG. 12 illustrates a configuration of the latest generation table 1005.

The latest generation table 1005 exists for each PVOL 10P (of each SS-Family 9), and indicates the generation (generation #) of the PVOL 10P.

FIG. 13 illustrates a configuration of the collection management table 1006.

The collection management table 1006 may be, for example, a bitmap, and exists for each PVOL 10P (of each SS-Family 9), that is, for each Dir-Info generation management tree 70. The collection management table 1006 has an entry for each Dir-Info. The entry includes information such as a Dir-Info #1701 and a collection request 1702.

The Dir-Info #1701 represents the identification number of the Dir-Info. The collection request 1702 indicates whether the collection of Dir-Info is requested. "1" indicates that the collection is requested, and "0" indicates that the collection is not requested.

Figures 14, 15:
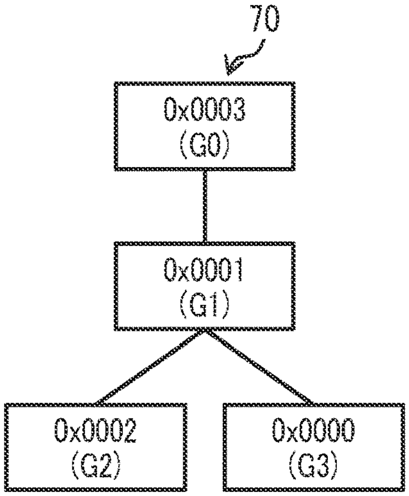
FIG. 14 illustrates a configuration of a generation management tree table.
FIG. 15 illustrates a configuration of a snapshot allocation management table.

FIG. 14 illustrates a configuration of the generation management tree table 1007.

The generation management tree table 1007 exists for each PVOL 10P (of each SS-Family 9), that is, for each Dir-Info generation management tree 70. The generation management tree table 1007 has an entry for each Dir-Info. The entry includes information such as a Dir-Info #1801, a generation #1802, a Prev 1803, and a Next 1804.

The Dir-Info #1801 represents the identification number of the Dir-Info. The generation #1802 indicates the generation of a VOL 10 corresponding to the Dir-Info. The Prev 1803 indicates the Dir-Info regarding the parent (one level higher) of the Dir-Info. The Next 1804 indicates the Dir-Info regarding a child (one level lower) of the Dir-Info. The number of entries in the Next 1804 may be the same as the number of pieces of child Dir-Info. FIG. 14 depicts two fields of the Next 1804 (Next-A 1804A and Next-B 1804B) because there are two pieces of child Dir-Info.

FIG. 15 illustrates a configuration of the snapshot allocation management table 1008.

The snapshot allocation management table 1008 exists for each SS-VDEV 11S, and indicates the mapping from addresses in the SS-VDEV 11S to addresses in the VOL 10. The snapshot allocation management table 1008 has an entry for each address in the SS-VDEV 11S. The entry includes information such as a block address 1901, a status 1902, an allocation destination VOL #1903, and an allocation destination address 1904.

The block address 1901 represents the address of a block in the SS-VDEV 11S. The status 1902 indicates whether the block is allocated to a VOL address ("1" indicates that the block is allocated, and "0" indicates that the block is free). The allocation destination VOL #1903 represents the identification number of the VOL 10 (PVOL 10P or SVOL 10S) having the address of a block allocation destination ("n/a" indicates that the block is unallocated). The allocation destination address 1904 represents the address (block address) to which the block is allocated ("n/a" indicates that the block is unallocated).

FIG. 16 illustrates a configuration of the Dir management table 1009.

The Dir management table 1009 exists for each Dir-Info, and represents Mapping-Info that is referenced for each data (block data). For example, the Dir management table 1009 has an entry for each address (block address). The entry includes information such as a VOL/VDEV address 2001 and a reference destination Mapping-Info #2002.

The VOL/VDEV address 2001 represents an address (block address) in the VOL 10 (PVOL 10P or SVOL 10S) or an address in the VDEV 11 (SS-VDEV 11S or Dedup-VDEV 11D). The reference destination Mapping-Info #2002 represents the identification number of the reference destination Mapping-Info.

FIG. 17 illustrates a configuration of the SS-Mapping management table 1010.

The SS-Mapping management table 1010 exists for each Dir-Info regarding the VOL 10. The SS-Mapping management table 1010 has an entry for each SS-Mapping-Info corresponding to the Dir-Info regarding the VOL 10. The entry includes information such as a Mapping-Info #2101, a reference destination address 2102, a reference destination SS-VDEV #2103, and a generation #2104.

The Mapping-Info #2101 represents the identification number of the SS-Mapping-Info. The reference destination address 2102 represents the address (the address in the SS-VDEV 11S) referenced by the SS-Mapping-Info. The reference destination SS-VDEV #2103 represents the identification number of the SS-VDEV 11S having the address referenced by the SS-Mapping-Info. The generation #2104 indicates the generation of data corresponding to the SS-Mapping-Info.

FIG. 18 illustrates a configuration of the compression allocation management table 1011.

The compression allocation management table 1011 exists for each CR-VDEV 11C, and has the compression allocation information regarding each subblock in the CR-VDEV 11C. The compression allocation management table 1011 has an entry equivalent to the compression allocation information regarding each subblock in the CR-VDEV 11C. The entry includes information such as a sub-block address 2201, a data length 2202, a status 2203, a first sub-block address 2204, an allocation destination VDEV #2205, and an allocation destination address 2206.

The sub-block address 2201 represents the address of a sub-block. The data length 2202 indicates the number of sub-blocks included in a sub-block group (having one or more sub-blocks) in which compressed data is stored (e.g., "2" indicates that the compressed data exists in two sub-blocks). The status 2203 represents the status of the subblock ("0" indicates that the sub-block is free, "1" indicates that the sub-block is allocated, and "2" indicates that the sub-block is subject to GC (garbage collection)). The first sub-block address 2204 represents the address of the first sub-block among one or more sub-blocks (one or more sub-blocks in which compressed data is stored). The allocation destination VDEV #2205 represents the identification number of the VDEV 11 (SS-VDEV 11S or Dedup-VDEV 11D) having the block to which the sub-block is allocated. The allocation destination address 2206 represents the address of the block to which the sub-block is allocated (the block address in the SS-VDEV 11S or in the Dedup-VDEV 11D).

FIG. 19 illustrates a configuration of the CR-Mapping management table 1012.

The CR-Mapping management table 1012 exists for each Dir-Info regarding the Dedup-VDEV 11D and for each Dir-Info regarding the SS-VDEV 11S. The CR-Mapping management table 1012 has an entry for each CR-Mapping-Info corresponding to the Dir-Info regarding the Dedup-VDEV 11D and for each CR-Mapping-Info corresponding to the Dir-Info regarding the SS-VDEV 11S. The entry includes information such as a Mapping-Info #2301, a reference destination address 2302, a reference destination CR-VDEV #2303, and a data length 2304.

The mapping-Info #2301 represents the identification number of the CR-Mapping-Info. The reference destination address 2302 represents the address (the address of the first sub-block in a sub-block group) referenced by the CR-Mapping-Info. The reference destination CR-VDEV #2303 represents the identification number of the CR-VDEV 11C having the sub-block address referenced by the CR-Mapping-Info. The data length 2304 indicates the number of blocks (the blocks in the Dedup-VDEV 11D) referenced by the CR-Mapping-Info or the number of sub-blocks included in the sub-block group referenced by the CR-Mapping-Info.

FIG. 20 illustrates a configuration of the Dedup-Dir management table 1013.

The Dedup-Dir management table 1013 exists for each Dedup-VDEV 11D, and is equivalent to Dedup-Dir-Info. The Dedup-Dir management table 1013 has an entry for each address in the Dedup-VDEV 11D. The entry includes information such as a Dedup-VDEV address 2401 and a reference destination allocation information #2402.

The Dedup-VDEV address 2401 represents an address (block address) in the Dedup-VDEV 11D. The reference destination allocation information #2402 represents the identification number of reference destination Dedup allocation information.

FIG. 21 illustrates a configuration of the Dedup allocation management table 1014.

The Dedup allocation management table 1014 exists for each Dedup-VDEV 11D (for each Dedup-Dir-Info), and represents dereferencing mapping from Dedup allocation information regarding an address in the Dedup-VDEV 11D to an address in the SS-VDEV 11S. The Dedup allocation management table 1014 has an entry for each Dedup allocation information. The entry includes information such as an allocation information #2501, an allocation destination SS-VDEV #2502, an allocation destination address 2503, and a linked allocation information #2504.

The allocation information #2501 represents the identification number of the Dedup allocation information. The allocation destination SS-VDEV #2502 represents the identification number of the SS-VDEV 11S having the address referenced by the Dedup allocation information. The allocation destination address 2503 represents the address (the block address in the SS-VDEV 11S) referenced by the Dedup allocation information. The linked allocation information #2504 represents the identification number of the Dedup allocation information linked to the Dedup allocation information.

According to FIG. 21, the Dedup allocation information #"3" is linked to the Dedup allocation information #"1," and no Dedup allocation information is linked to the Dedup allocation information #"3." Therefore, it is obvious that duplicate data in the Dedup-VDEV address corresponding to the Dedup allocation information #"1" is duplicate data in the SS-VDEV 11S referenced by the Dedup allocation information #"1" and in the SS-VDEV 11S referenced by the Dedup allocation information #"3." Since the number of duplicate data is indefinite, the Dedup allocation information is linked in accordance with the number of duplicate data. In a case where duplicate data exists in N pieces of SS-VDEV 11S, N pieces of sequential Dedup allocation information are prepared.

FIG. 22 illustrates a configuration of the Pool-Mapping management table 1015.

The Pool-Mapping management table 1015 exists for each CR-VDEV 11C. The Pool-Mapping management table 1015 has an entry for each area that is provided in units of a page size within the CR-VDEV 11C. The entry includes information such as a VDEV address 2601 and a page #2602.

The VDEV address 2601 represents the start address of an area (e.g., a plurality of blocks) provided in units of the page size. The page #2602 represents the identification number of an allocated page 14 (e.g., the address of the page 14 in the pool 13). It should be noted that if there are a plurality of pools 13, the page #2602 may include the identification number of the pool 13 having the page 14.

FIG. 23 illustrates a configuration of the Pool allocation management table 1016.

For example, in a case where there are a plurality of pools 13, the Pool allocation management table 1016 exists for each pool 13. The Pool allocation management table 1016 indicates the correspondence between the pages 14 and the areas in the CR-VDEV 11C. The Pool allocation management table 1016 has an entry for each page 14. The entry includes information such as a page #2701, an RG #2702, a start address 2703, a status 2704, an allocation destination VDEV #2705, and an allocation destination address 2706.

The page #2701 represents the identification number of a page 14. The RG #2702 represents the identification number of a RAID group (in the present embodiment, a RAID group formed by two or more SSDs 220) on which the page 14 is based. The start address 2703 represents the start address of the page 14. The status 2704 represents the status of the page 14 ("1" indicates that the page is allocated, and "0" indicates that the page is free). The allocation destination VDEV #2705 represents the identification number of the CR-VDEV 11C to which the page 14 is assigned ("n/a" indicates that the page is unallocated). The allocation destination address 2706 represents the allocation destination address of the page 14 (an address in the CR-VDEV 11C) ("n/a" indicates that the page is unallocated).

Figure 24:
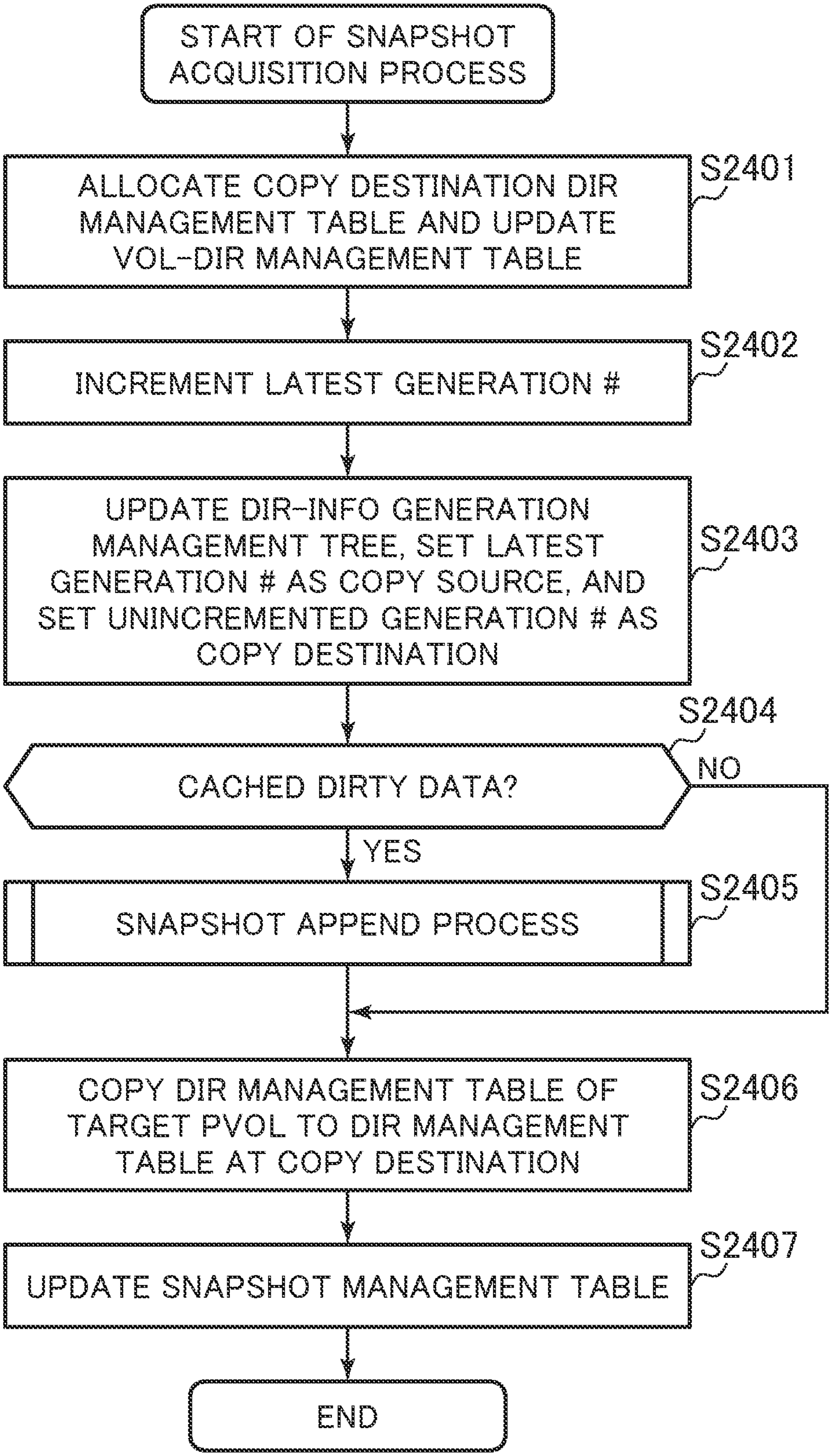
FIG. 24 is a flowchart illustrating a snapshot acquisition process.

FIG. 24 is a flowchart illustrating a snapshot acquisition process. The snapshot acquisition process is performed by the snapshot acquisition program 1101 in accordance with a snapshot acquisition instruction from the management system 203 (or another system such as the server system 202). The snapshot acquisition instruction specifies, for example, the target PVOL 10P.

First, the snapshot acquisition program 1101 allocates the Dir management table 1009 as a copy destination, and updates the VOL-Dir management table 1004 (step S2401).

The snapshot acquisition program 1101 increments the latest generation #(step S2402), and updates the generation management tree table 1007 (Dir-Info generation management tree 70) (step S2403). In this instance, the snapshot acquisition program 1101 sets the latest generation # as the copy source, and sets the unincremented generation # as the copy destination.

The snapshot acquisition program 1101 determines whether cached dirty data exists for the target PVOL 10P (step S2404). The "cached dirty data" may be data that is stored in the cache section 903 and is still not written into the pool 13.

If the result of determination in step S2404 is true ("YES" at step S2404), the snapshot acquisition program 1101 causes the snapshot append program 1106 to perform a snapshot append process (step S2405).

If the result of determination in step S2404 is false ("NO" at step S2404), or after completion of step S2405, the snapshot acquisition program 1101 copies the Dir management table 1009 of the target PVOL 10P to the Dir management table 1009 at the copy destination (step S2406).

Subsequently, the snapshot acquisition program 1101 updates the snapshot management table 1003 (step S2407), and ends the process. In step S2407, an entry having the PVOL #1401 representing the identification number of the target PVOL 10P, the SVOL #1402 representing the identification number of the acquired snapshot (SVOL 10S), and the acquisition time 1403 representing the time of acquisition is added.

Figure 25:
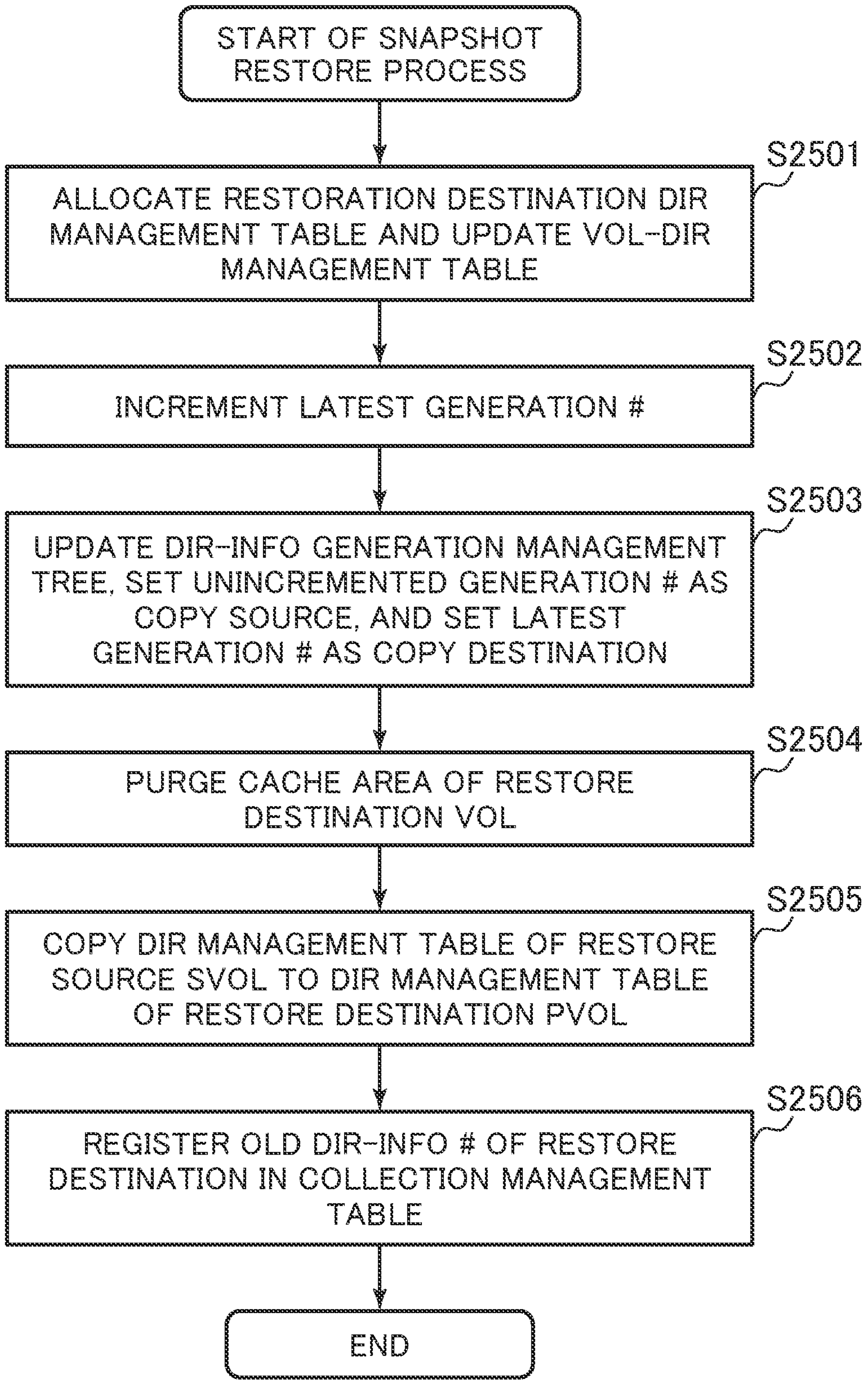
FIG. 25 is a flowchart illustrating a snapshot restore process.

FIG. 25 is a flowchart illustrating a snapshot restore process. The snapshot restore process is performed by the snapshot restore program 1102 in accordance with a restore instruction from the management system 203 (or another system such as the server system 202). The restore instruction specifies, for example, the restore source SVOL and the restore destination PVOL.

First, the snapshot restore program 1102 allocates the Dir management table 1009 as the restoration destination, and updates the VOL-Dir management table 1004 (step S2501).

The snapshot restore program 1102 increments the latest generation # (step S2502), and updates the generation management tree table 1007 (Dir-Info generation management tree 70) (step S2503). In this instance, the snapshot restore program 1102 sets the unincremented generation # as the copy source, and sets the latest generation # as the copy destination.

The snapshot restore program 1102 purges the cache area (the area of the cache section 903) of the restore destination PVOL (step S2504).

The snapshot restore program 1102 copies the Dir management table 1009 of the restore source SVOL to the Dir management table 1009 of the restore destination PVOL (step S2505).

Subsequently, the snapshot restore program 1102 registers the Dir-Info # of old Dir-Info regarding the restore destination in the collection management table 1006 (step S2506), and ends the process. In step S2506, the collection request 1702 related to the Dir-Info # is set to "1."

Figure 26:
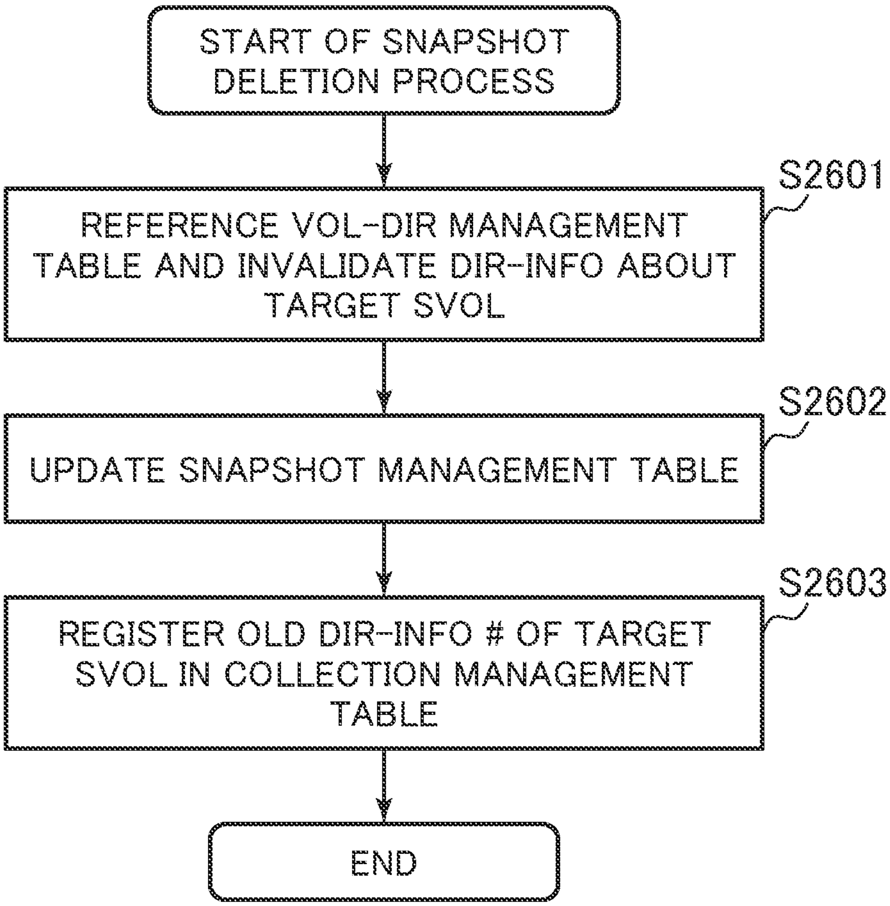
FIG. 26 is a flowchart illustrating a snapshot deletion process.

FIG. 26 is a flowchart illustrating a snapshot deletion process. The snapshot deletion process is performed by the snapshot deletion program 1103 in accordance with a snapshot deletion instruction from the management system 203 (or another system such as the server system 202). The snapshot deletion instruction specifies, for example, the target SVOL.

First, the snapshot deletion program 1103 references the VOL-Dir management table 1004, and invalidates the Dir-Info (Dir-Info #1503) regarding the target SVOL (step S2601).

Then, the snapshot deletion program 1103 updates the snapshot management table 1003 (step S2602), registers the old Dir-Info # of the target SVOL in the collection management table 1006 (step S2603), and ends the process. In step S2603, the collection request 1702 related to the above-mentioned Dir-Info # is set to "1."

Figure 27:
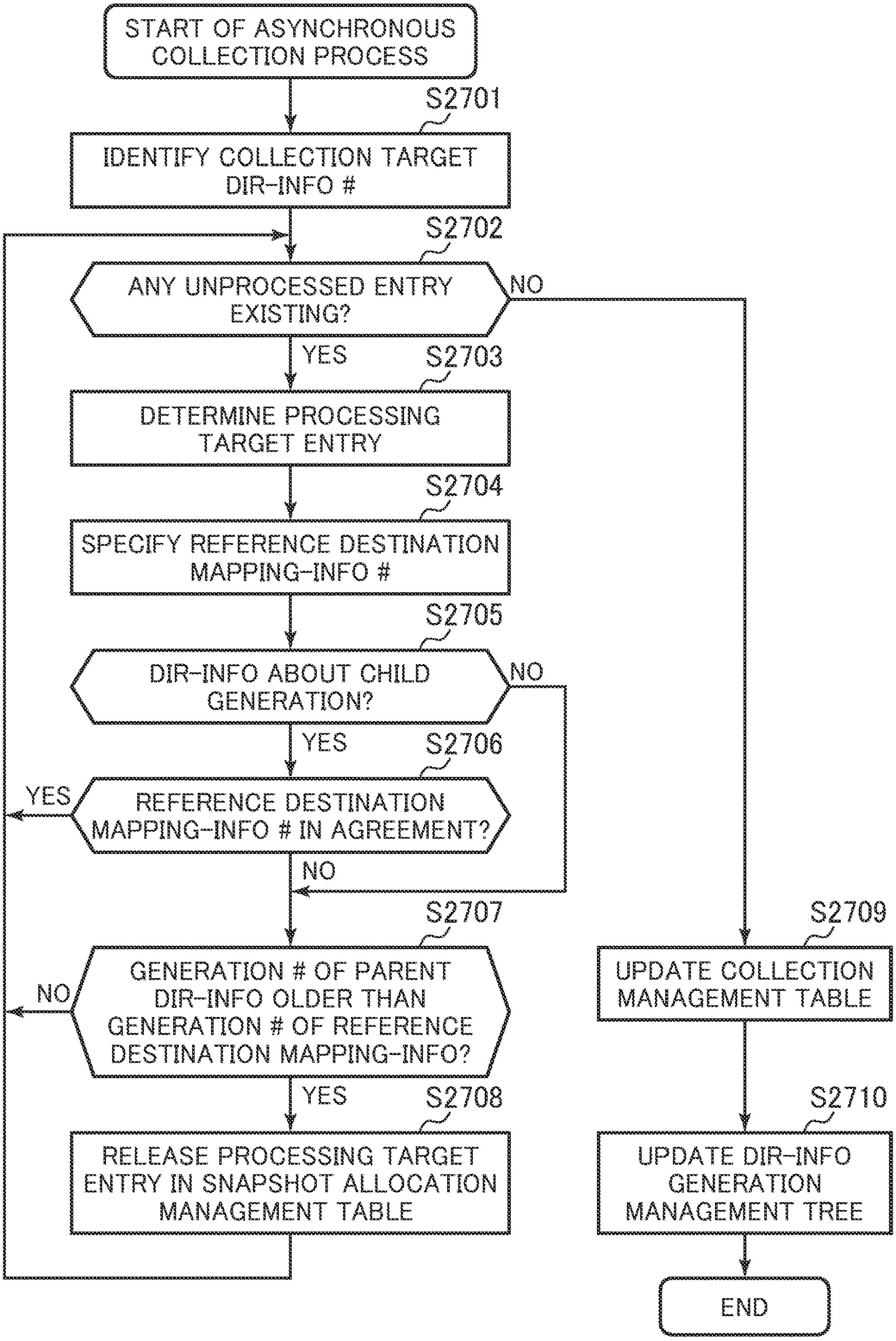
FIG. 27 is a flowchart illustrating an asynchronous collection process.

FIG. 27 is a flowchart illustrating an asynchronous collection process. The asynchronous collection process is performed, for example, periodically by the asynchronous collection program 1104.

First, the asynchronous collection program 1104 identifies the collection target Dir-Info # from the collection management table 1006 (step S2701). The "collection target Dir-Info #" is the Dir-Info # for which the collection request 1702 is "1." The asynchronous collection program 1104 references the generation management tree table 1007, checks the entry of the collection target Dir-Info #, and does not select Dir-Info that has two or more children.

Subsequently, the asynchronous collection program 1104 determines whether there is any unprocessed entry (step S2702). The above-mentioned "unprocessed entry" denotes an entry for which the collection request 1702 is "1" in the collection management table 1006, and for which the asynchronous collection process has not yet been performed.

If the result of determination in step S2702 is true ("YES" at step S2702), the asynchronous collection program 1104 determines a processing target entry (the entry containing a collection request 1702 of "1") by choosing from one or more unprocessed entries (step S2703), and specifies the reference destination Mapping-Info #2002 from the Dir management table 1009 related to target Dir-Info (Dir-Info identified from the Dir-Info #1701 of the processing target entry) (step S2704).

The asynchronous collection program 1104 references the generation management tree table 1007 to determine whether there is Dir-Info regarding a child generation of the target Dir-Info (step S2705).

If the result of determination in step S2705 is true ("YES" at step S2705), the asynchronous collection program 1104 specifies the reference destination Mapping-Info #2002 from the Dir management table 1009 related to child generation Dir-Info, and determines whether the reference destination Mapping-Info #2002 of the target Dir-Info agrees with the reference destination Mapping-Info #2002 of the child generation Dir-Info (step S2706). If the result of determination in step S2706 is true ("YES" at step S2706), the processing returns to step S2702.

If the result of determination in step S2706 is false ("NO" at step S2706), or if the result of determination in step S2705 is false ("NO" at step S2705), the asynchronous collection program 1104 determines whether the generation # of parent generation Dir-Info for the target Dir-Info is older than the generation #2104 (see FIG. 21) of the reference destination Mapping-Info for the target Dir-Info (S2707). If the result of determination in step S2707 is false ("NO" at step S2707), the processing returns to step S2702.

If the result of determination in step S2707 is true ("YES" at step S2707), the asynchronous collection program 1104 initializes the processing target entry in the SS-Mapping management table 1010, and releases the processing target entry in the snapshot allocation management table 1008 (step S2708). Subsequently, the processing returns to step S2702. The release in step S2708 is equivalent to the release of a block in the SS-VDEV.

If the result of determination in step S2702 is false ("NO" at step S2702), the asynchronous collection program 1104 updates the collection management table 1006 (step S2709), additionally updates the generation management tree table 1007 (Dir-Info generation management tree 70) (step S2710), and ends the process.

Figure 28:
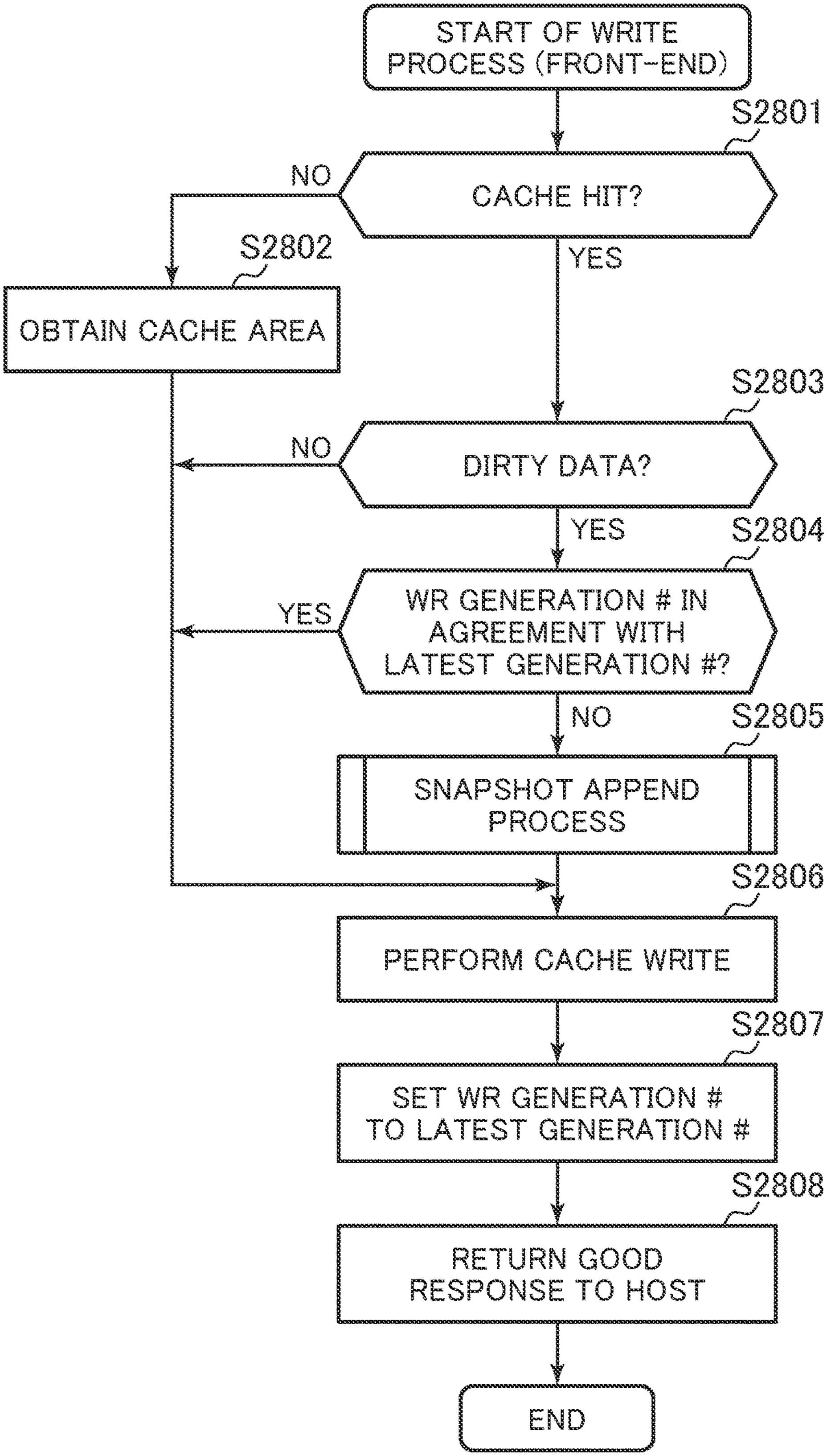
FIG. 28 is a flowchart illustrating a Write process (front-end)

FIG. 28 is a flowchart illustrating a Write process (front-end). The Write process (front-end) is performed by the read/write program 1105 when a write request is received from the server system 202.

First, the read/write program 1105 determines whether target data specified by the write request results in a cache hit (step S2801). The "cache hit" denotes a state where a cache area corresponding to a write destination VOL address (the volume address specified by the write request) of the target data is already obtained. If the result of determination in step S2801 is false ("NO" at step S2801), the read/write program 1105 obtains a cache area corresponding to the write destination VOL address of the target data from the cache section 903 (step S2802). Subsequently, the processing proceeds to step S2806.

If the result of determination in step S2801 is true ("YES" at step S2801), the read/write program 1105 determines whether cache hit data (data in the obtained cache area) is dirty data (data that is still unreflected (unwritten) in the pool 13) (step S2803). If the result of determination in step S2803 is false ("NO" at step S2803), the processing proceeds to step S2806.

If the result of determination in step S2803 is true ("YES" at step S2803), the read/write program 1105 determines whether the WR (Write) generation # of the dirty data agrees with the generation # of the target data specified by the write request (step S2804). The "WR generation #" is retained, for example, by cache data management information (not depicted in the drawings). Further, the generation # of the target data specified by the write request is obtained from a latest generation #403. In step S2804, the processing is performed to avoid updating the dirty data with the target data specified by the write request and ruining snapshot data before an append process is performed on snapshot target data (dirty data) acquired immediately before.

If the result of determination in step S2804 is false ("NO" at step S2804), the read/write program 1105 causes the snapshot append program 1106 to perform the snapshot append process (step S2805).

After completion of step S2802, or if the result of determination in step S2804 is true ("YES" at step S2804), the read/write program 1105 writes the target data specified by the write request into the cache area obtained in step S2802 or into a cache area obtained through step S2805 (step S2806). Subsequently, the read/write program 1105 sets the WR generation # of the data written in step S2806 to the latest generation # compared in step S2804 (step S2807), and returns a normal response (Good response) to the server system 202 (step S2808).

Figure 29:
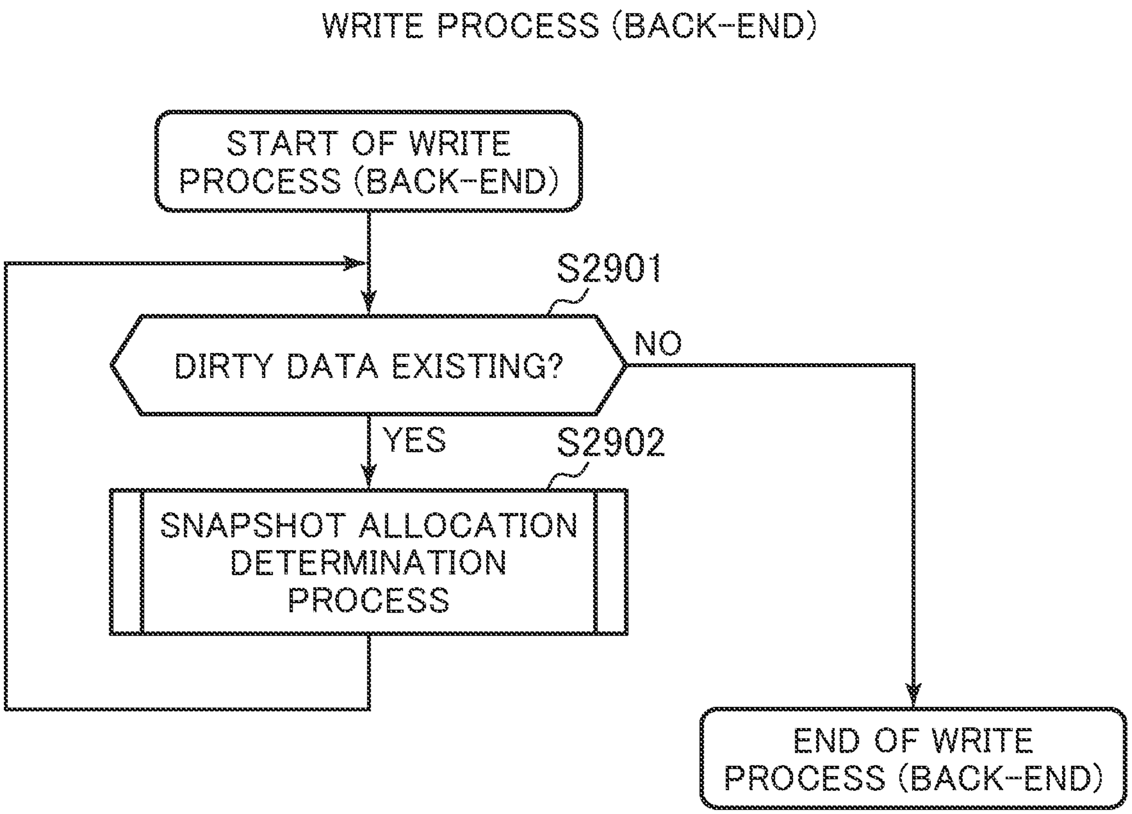
FIG. 29 is a flowchart illustrating a Write process (back-end)

FIG. 29 is a flowchart illustrating a Write process (back-end). The Write process (back end) is a process of writing unreflected data (dirty data) into the pool 13 in a case where the unreflected data exists in the cache section 903. The Write process (back end) is performed synchronously or asynchronously with the Write processing (front end). The Write process (back-end) is performed by the read/write program 1105.

The read/write program 1105 determines whether there is dirty data in the cache section 903 (step S2901). If the result of determination in step S2901 is true ("YES" at step S2901), the read/write program 1105 causes the snapshot append program 1106 to perform a snapshot allocation determination process (step S2902).

Figure 30:
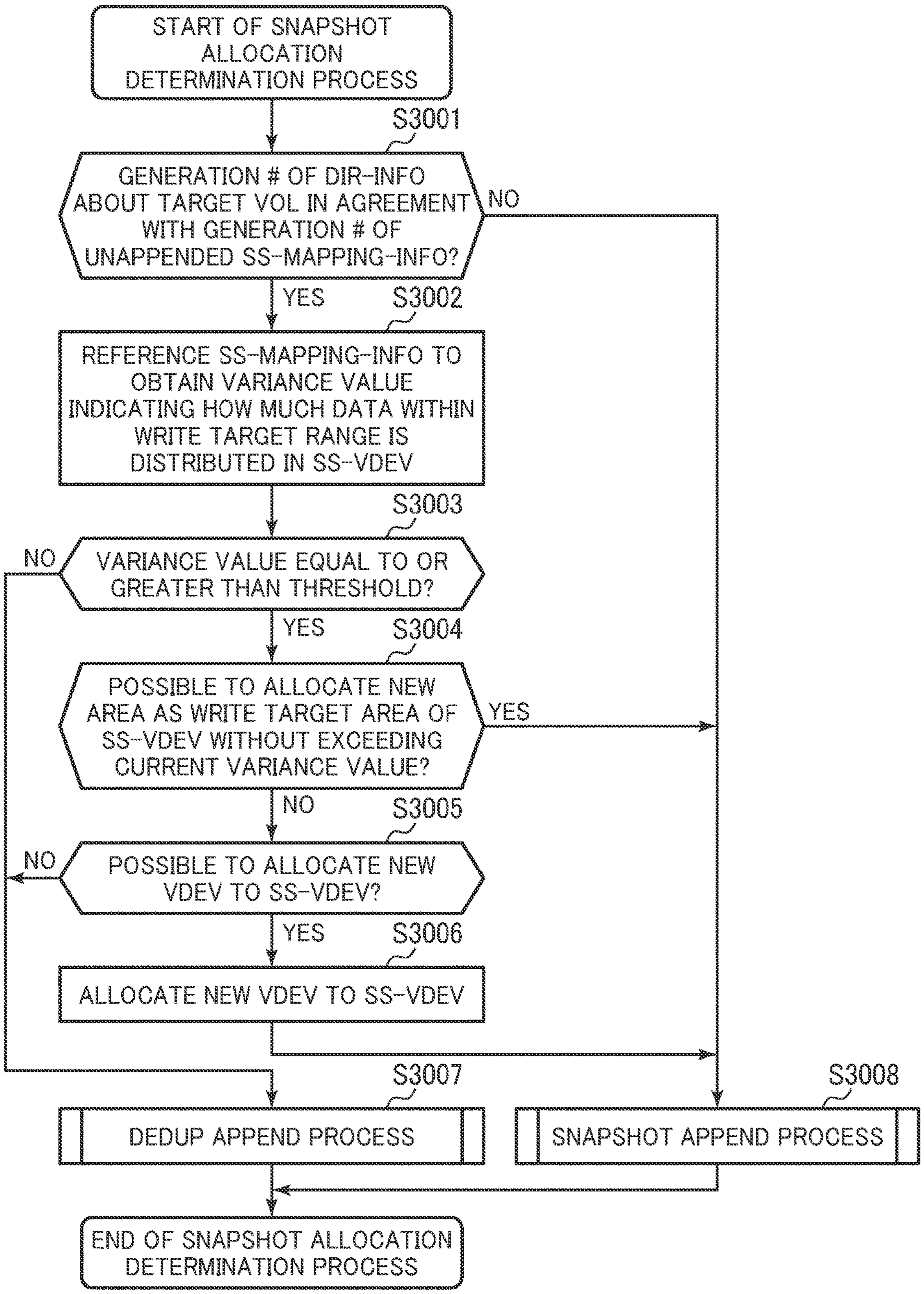
FIG. 30 is a flowchart illustrating a snapshot allocation determination process.

FIG. 30 is a flowchart illustrating the snapshot allocation determination process. The snapshot allocation determination process determines whether to newly allocate an area of the SS-VDEV 11S to an area of the PVOL 10P that is specified by a write request from a host, or overwrite an area already allocated to the SS-VDEV 11S with data in the area of the PVOL 10P, which is specified by the write request from the host. The snapshot allocation determination process is performed by the snapshot allocation determination program 1113 called by the read/write program 1105.

The snapshot allocation determination program 1113 first determines whether the generation # of Dir-Info regarding a target VOL (data write destination volume) agrees with the generation # of unappended SS-Mapping-Info (step S3001). If the result of determination in step S3001 is false ("NO" at step S3001), the snapshot allocation determination program 1113 performs the snapshot append process (step S3009).

If the result of determination in step S3001 is true ("YES" at step S3001), the processing proceeds to step S3002. When the result of determination in step S3001 is true, the data within a range specified by the write request from the host is not referenced by other snapshots (this state is hereinafter referred to as the independent state). Therefore, overwriting at the same address in the SS-VDEV makes it possible to eliminate the need to update the snapshot allocation management table and the SS-Mapping management table.

Next, the snapshot allocation determination program 1113 references the SS-Mapping-Info to obtain a numerical value that indicates how much data within a write target range is distributed and stored in the SS-VDEV (step S3002). A numerical value indicating the degree of distribution mentioned above is hereinafter referred to as the variance value. In a case, for example, where 256 KB of data is written from the host, the variance value is 3 if unupdated SS-Mapping information is stored in three chunks of data, namely, 32 KB, 128 KB, and 96 KB chunks, at separate addresses in the SS-VDEV. This situation can occur if only a portion of a created snapshot is updated. If the variance value is great, it is necessary to separately perform a process of updating the mapping from the SS-VDEV to the CR-VDEV or the Dedup-VDEV. As a result, write processing overhead increases to reduce throughput. Therefore, in a case where a write of data greater in size than the management unit of mapping information is requested and the data is distributed within the SS-VDEV, the resulting state is the independent state. In this state, it can be expected that the amount of processing will be reduced by performing the snapshot append process and collectively allocating contiguous areas in the SS-VDEV.

Next, the snapshot allocation determination program 1113 determines whether the variance value obtained in step S3002 is equal to or greater than a threshold (step S3003). If the variance value is equal to or greater than the threshold ("YES" at step S3003), the processing proceeds to step S3004. If the variance value is smaller than the threshold ("NO" at step S3003), the processing proceeds to step S3007. The above-mentioned threshold is set to determine whether a greater performance advantage is provided by updating the mapping information multiple times in a distributed state or by collectively updating the mapping information with a new area allocated. Specifically, the threshold is set in accordance with actual program implementation and performance characteristics. For example, if the variance value is not greater than 2, the threshold should be set to 3 if overwriting provides better performance than allocating a new area to a snapshot space.

Next, the snapshot allocation determination program 1113 determines whether it is possible to allocate a new area as a write target area of the SS-VDEV without exceeding the current variance value (step S3004). More specifically, the snapshot allocation management table 1008 is referenced to determine whether unallocated contiguous areas can be obtained. If it is determined that allocation is possible ("YES" at step S3004), the snapshot allocation determination program 1113 performs the snapshot append process (step S3008). If it is determined that allocation is not possible ("NO" at step S3004), the processing proceeds to step S3005.

Next, the snapshot allocation determination program 1113 determines whether a new VDEV can be allocated to the SS-VDEV (step S3005). If it is determined that allocation is possible ("YES" at step S3005), the processing proceeds to step S3006 and allocates the new VDEV to the SS-VDEV. Next, the snapshot allocation determination program 1113 performs the snapshot append process (step S3008) in order to allocate a new area to the SS-VDEV. If it is determined that new VDEV allocation is not possible ("NO" at step S3005), the processing proceeds to step S3007 and overwrites the SS-VDEV.

In step S3007, the snapshot allocation determination program 1113 performs a Dedup append process. In this case, unlike the case of proceeding to the snapshot append process in step S3008, the snapshot append process is skipped to overwrite at the same address in the SS-VDEV. This eliminates the need to update the snapshot allocation management table and the SS-Mapping management table.

Figure 31:
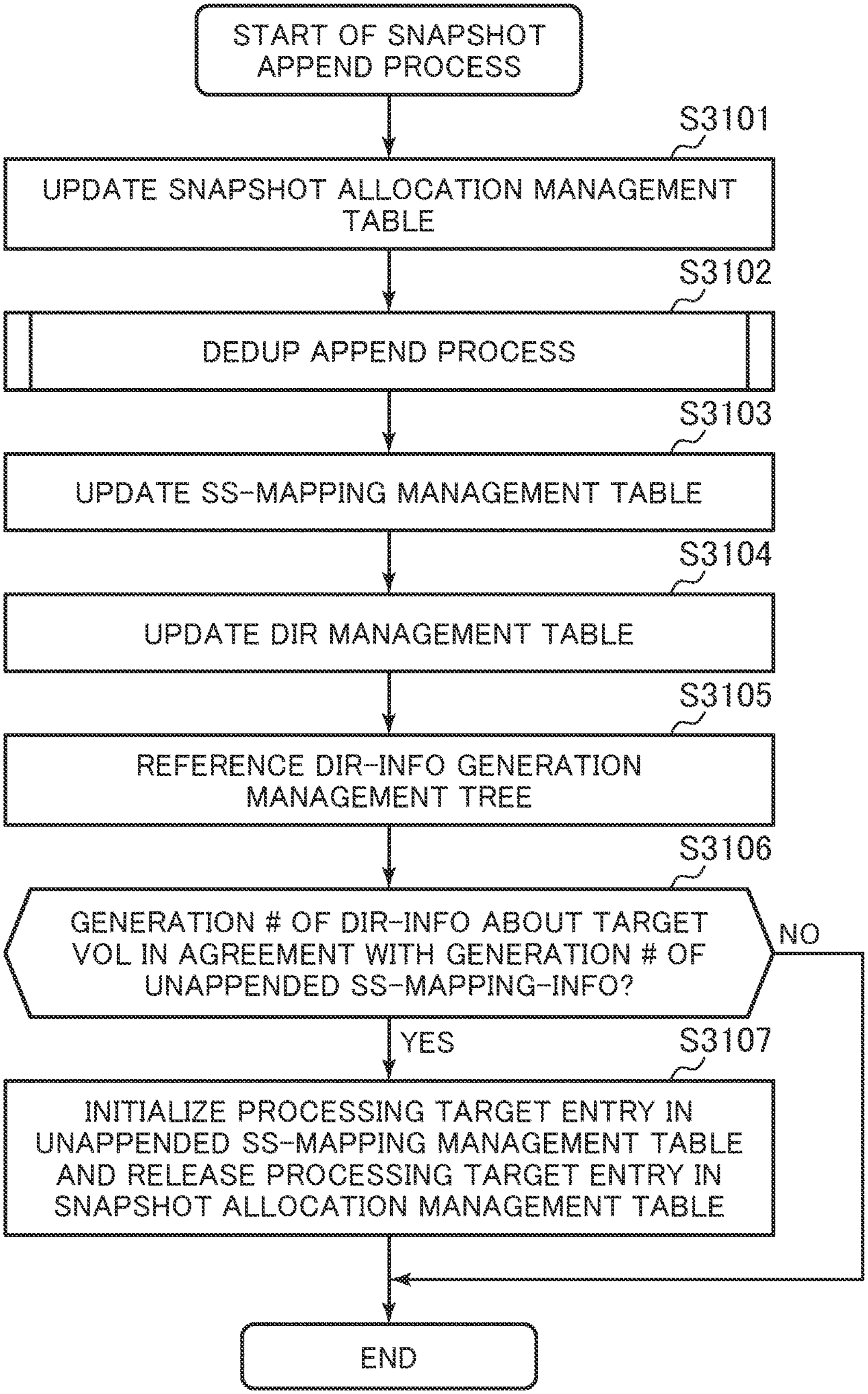
FIG. 31 is a flowchart illustrating a snapshot append process.

FIG. 31 is a flowchart illustrating the snapshot append process. The snapshot append process is a process of newly allocating an area of the SS-VDEV 11S to an area of the PVOL 10P specified by a write request from the host. The snapshot append process is performed by the snapshot append program 1106 that is called by the snapshot acquisition program 1101 or by the read/write program 1105.

By updating the snapshot allocation management table 1008, the snapshot append program 1106 obtains a new area (a block address whose status 1902 is "0") of a target SS-VDEV 11S (the SS-VDEV 11S corresponding to the SS-Family 9 including the target VOL (e.g., the SVOL to be acquired or the VOL into which data is to be written) (step S3101). Next, the snapshot append program 1106 causes the Dedup append program 1107 to perform the Dedup append process (step S3102).

Subsequently, the snapshot append program 1106 updates the SS-Mapping management table 1010 (step S3103). In step S3103, for example, the snapshot append program 1106 sets the latest generation #(the generation # indicated by the latest generation table 1005) as the generation #2104 corresponding to the Mapping-Info # of target SS-Mapping-Info. The above-mentioned "target SS-Mapping-Info" is the SS-Mapping-Info regarding data in the target VOL.

The snapshot append program 1106 updates the Dir management table 1009 related to the Dir-Info regarding the target SS-VDEV 11S (step S3104). In step S3104, the SS-Mapping-Info (information indicating the reference destination address in the SS-VDEV) regarding the data to be written is associated with the address of the data in the VOL 10.

The snapshot append program 1106 references the generation management tree table 1007 (Dir-Info generation management tree 70) (step S3105), and determines whether the generation # of Dir-Info regarding the target VOL (data write destination VOL) agrees with the generation # of the unappended SS-Mapping-Info (step S3106).

If the result of determination in step S3106 is true ("YES" at step S3106), it signifies that, after data is stored in an area of the SS-VDEV indicated by the unappended SS-Mapping-Info, a snapshot sharing the area is not created. That is to say, it can be determined that the area of the SS-VDEV indicated by the unappended SS-Mapping-Info has turned into garbage. Consequently, the snapshot append program 1106 initializes the processing target entry in the unappended SS-Mapping management table 1010, releases the processing target entry in the snapshot allocation management table 1008 (step S3107), and ends the process.

If the result of determination in step S3106 is false ("NO" at step S3106), it signifies that, after the data is stored in the area of the SS-VDEV indicated by the unappended SS-Mapping-Info, a snapshot sharing the area is created to increment the generation # of the DIR-Info. In this case, no area of the unappended SS-VDEV turns into garbage. Therefore, the unappended SS-Mapping management table 1010 is left as is, and the processing ends.

Figure 32:
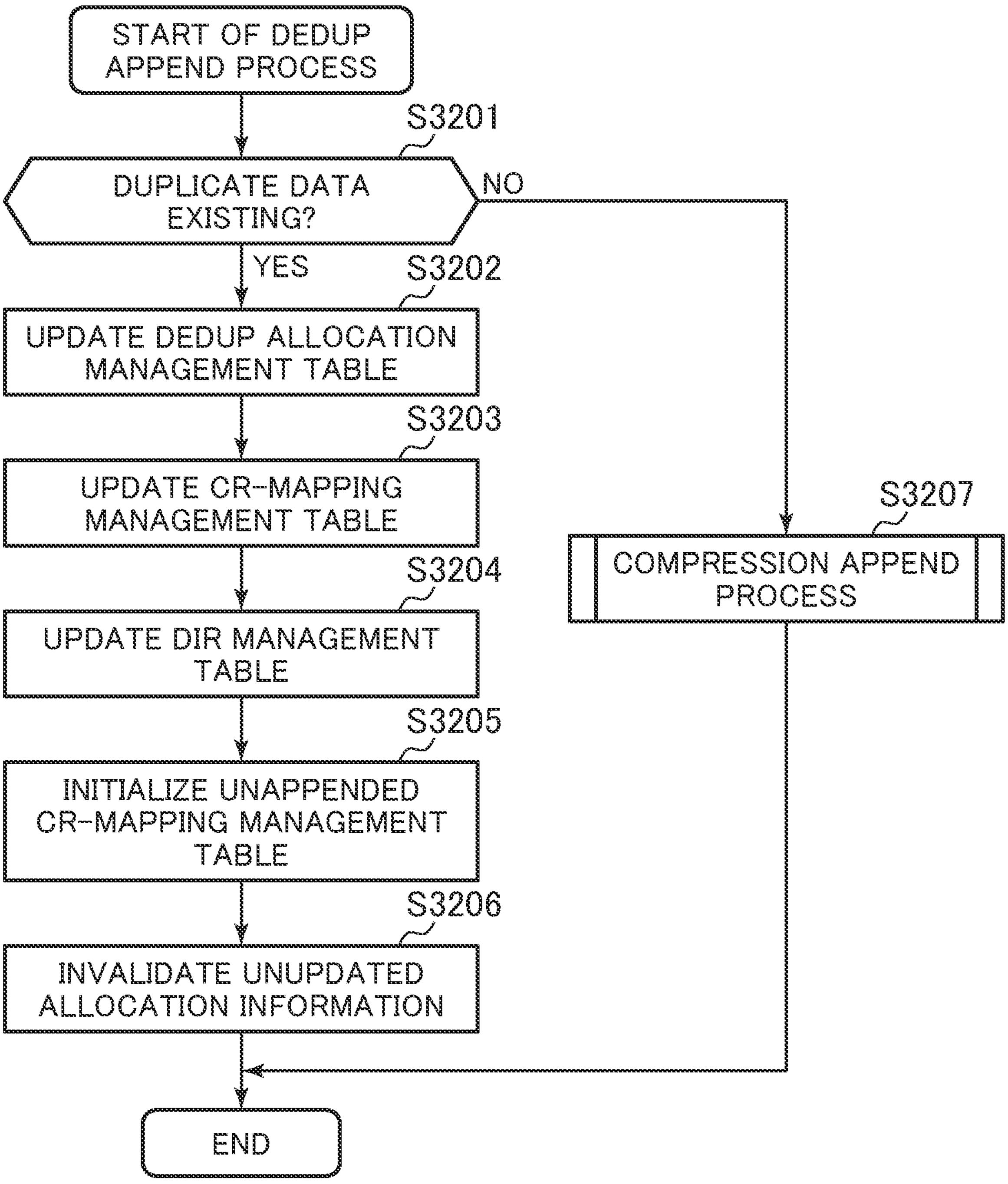
FIG. 32 is a flowchart illustrating a Dedup append process.

FIG. 32 is a flowchart illustrating the Dedup append process. The Dedup append process is performed by the Dedup append program 1107 called by the snapshot append program 1106.

The Dedup append program 1107 determines whether duplicate data exists among the data stored in the pool (step S3201). Although details are not illustrated in FIG. 32, checking all data for the same contents would require a huge amount of calculation. Therefore, for example, computations are performed on each data by using a hash function to calculate a typical value of data, such as a hash value, and then processing is performed to compare only data that agree with each other in typical value. If the result of determination in step S3201 is false ("NO" at step S3201), the Dedup append program 1107 causes the compression append program 1108 to perform a compression append process (step S3207). As a result, the compressed data of data whose storage destination is the SS-VDEV 11S is stored in the CR-VDEV 11C without going through the Dedup-VDEV 11D and without changing the CPU 211 that acts as the processing entity.

If the result of determination in step S3201 is true ("YES" at step S3201), the Dedup append program 1107 updates the Dedup allocation management table 1014 (step S3202). In step S3202, an entry for Dedup allocation information regarding the data to be stored in a target Dedup-VDEV 11D is added to the Dedup allocation management table 1014.

The Dedup append program 1107 updates the CR-Mapping management table 1012 (step S3203). In step S3203, an entry for CR-Mapping-Info regarding the data to be stored in the Dedup-VDEV 11D is added to the CR-Mapping management table 1012.

The Dedup append program 1107 updates the Dir management table 1009 related to the Dir-Info regarding the target Dedup-VDEV 11D (step S3204). In step S3204, the CR-Mapping-Info (information indicating the reference destination address in the CR-VDEV 11CC) regarding the duplicate data is associated with an address in the target Dedup-VDEV 11D for the duplicate data. As described above, the used capacity of the pool is reduced by associating the duplicate data with already stored data.

The Dedup append program 1107 initializes the unappended CR-Mapping management table 1012 (step S3205).

The Dedup append program 1107 invalidates unupdated allocation information (step S3206). In step S3206, the Dedup append program 1107 updates the Dedup allocation management table 1014 and the compression allocation management table 1011. Additionally, in step S3206, as regards areas where the Dedup allocation management table 1014 has no allocation destinations, the processing target entry of the compression allocation information is turned into garbage.

Figure 33:
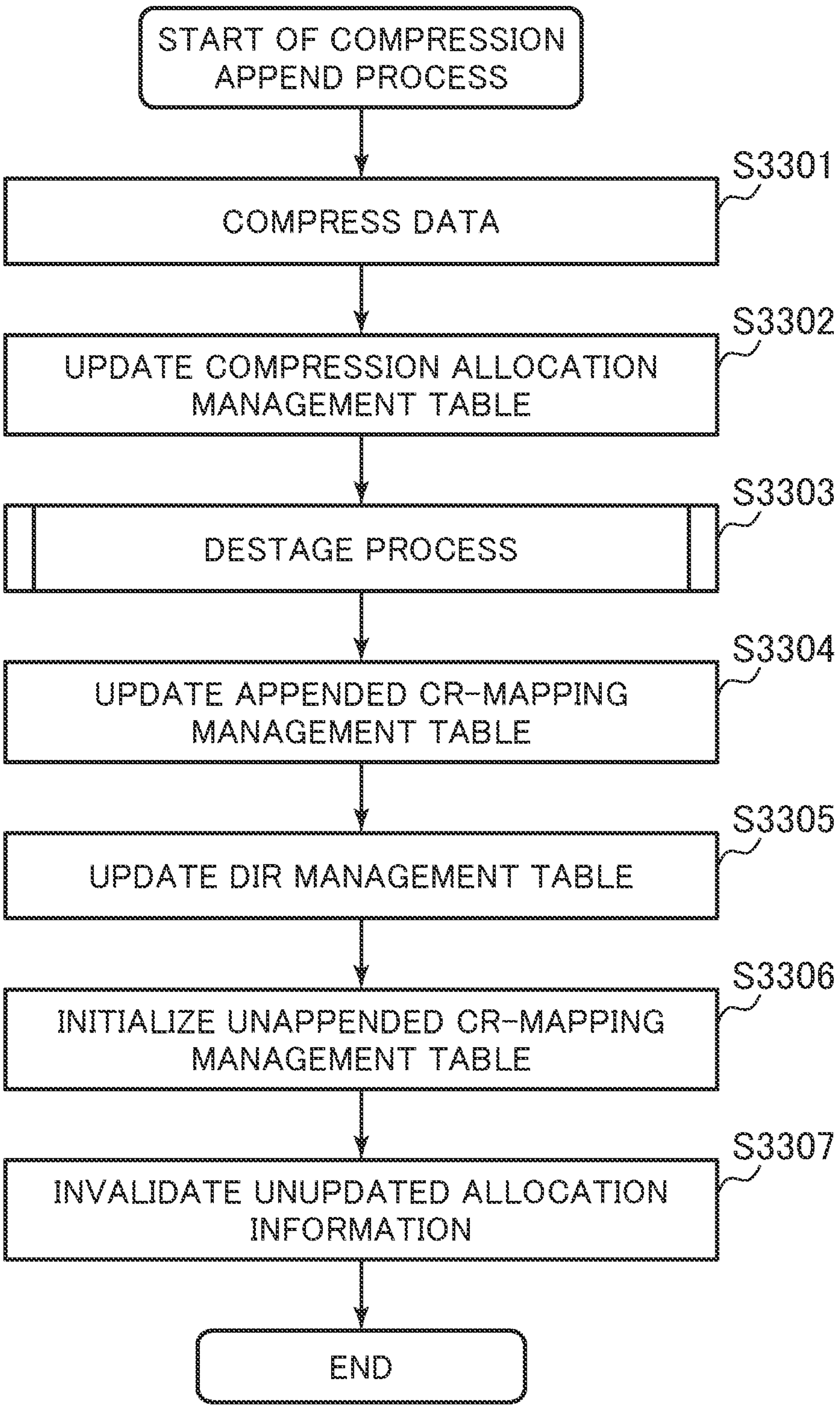
FIG. 33 is a flowchart illustrating a compression append process.

FIG. 33 is a flowchart illustrating the compression append process. The compression append process is performed by the compression append program 1108 called by the Dedup append program 1107.

The compression append program 1108 compresses the data to be written (step S3301). The compression append program 1108 updates the compression allocation management table 1011 (step S3302). In step S3302, as regards each of one or more sub-blocks serving as a compressed-data storage destination in step S3301, the entry for the sub-block is updated.

The compression append program 1108 causes the destage program 1109 to perform a destage process (step S3303).

The compression append program 1108 updates the appended CR-Mapping management table 1012 (step S3304).

The compression append program 1108 updates the Dir management table 1009 (step S3305).

The compression append program 1108 initializes the processing target entry in the unappended CR-Mapping management table 1012 (step S3306).

The compression append program 1108 invalidates the unupdated allocation information (step S3307). In step S3307, the Dedup append program 1107 updates the Dedup allocation management table 1014 and the compression allocation management table 1011. Additionally, in step S3307, as regards areas where the Dedup allocation management table 1014 has no allocation destinations, the processing target entry of the compression allocation information is turned into garbage.

Figure 34:
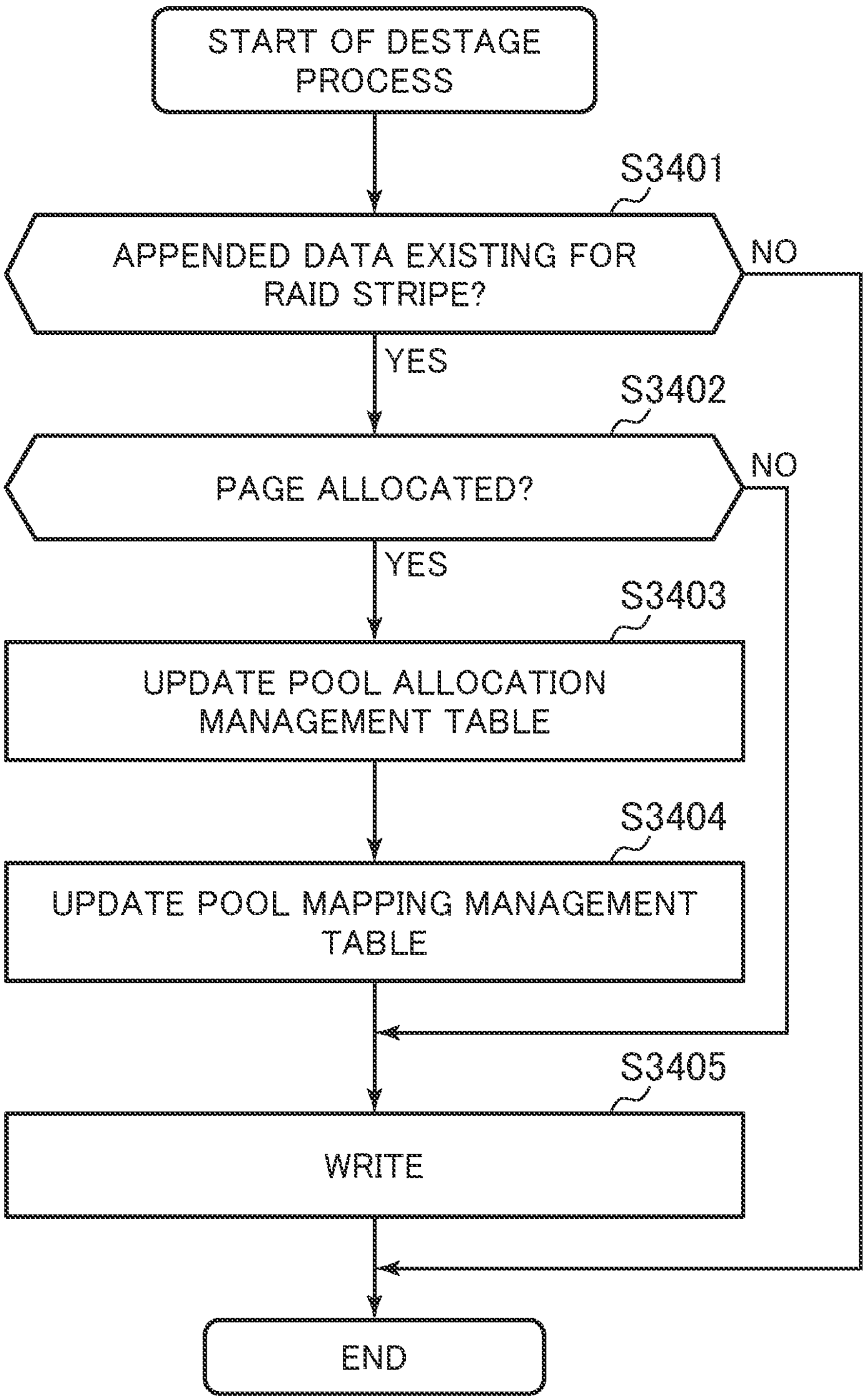
FIG. 34 is a flowchart illustrating a destage process.

FIG. 34 is a flowchart illustrating the destage process. The destage process is performed by the destage program 1109 called by the compression append program 1108.

The destage program 1109 determines whether the cache section 903 has appended data (one or more compressed data) for a RAID stripe (step S3401). The "RAID stripe" is a stripe in the RAID group (i.e., a storage area across a plurality of SSDs 220 forming the RAID group). In a case where the RAID level of the RAID group requires a parity, the size of "the appended data for the RAID stripe" may be the size of the stripe minus the size of the parity. If the result of determination in step S3401 is false ("NO" at step S3401), the processing ends.

If the result of determination in step S3401 is true ("YES" at step S3401), the destage program 1109 references the Pool-Mapping management table 1015, and determines whether the page 14 is already allocated to the storage destination (an address in the CR-VDEV 11C) for the appended data for the RAID stripe (step S3402). If the result of determination in step S3402 is false ("NO" at step S3402), the processing proceeds to step S3405.

If the result of determination in step S3402 is true ("YES" at step S3402), the destage program 1109 updates the Pool allocation management table 1016 (step S3403). More specifically, destage program 1109 allocates a page 14. In step S3403, entries related to the allocated page 14 (e.g., the status 2704, the allocation destination VDEV #2705, and the allocation destination address 2706) in the Pool allocation management table 1016 are updated.

The destage program 1109 registers the page #2602 of the allocated page for entries related to the storage destination for the appended data for the RAID stripe in the Pool allocation management table 1016 (step S3404).

The destage program 1109 writes the appended data for the RAID stripe into a stripe that is the basis of the page (step S3405). In a case where the RAID level requires a parity, the destage program 1109 generates the parity based on the appended data for the RAID stripe, and writes the parity into the stripe.

Figure 35:
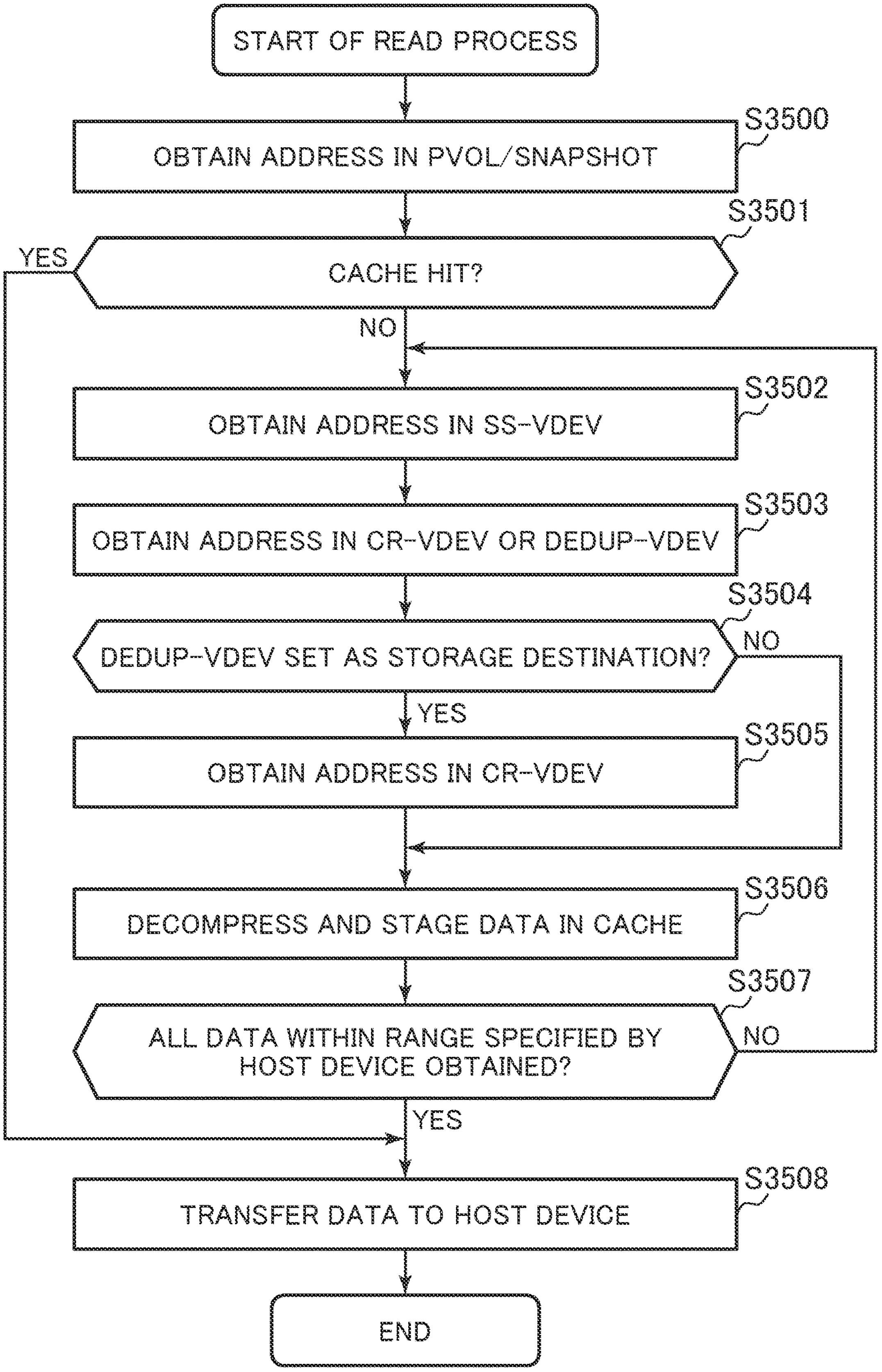
FIG. 35 is a flowchart illustrating a read process.

FIG. 35 is a flowchart illustrating a read process. The read process is performed by the read/write program 1105 in response to the read request from the host device.

First, in step S3500, the read/write program 1105 obtains the address of data in the PVOL or snapshot that is specified by the read request from the server system 202. Next, in step S3701, the read/write program 1105 determines whether target data specified by the read request results in a cache hit. If the target data specified by the read request results in a cache hit ("YES" at step S3501), the read/write program 1105 proceeds to step S3508. Meanwhile, if the cache hit does not occur ("NO" at step S3501), the read/write program 1105 proceeds to step S3502.

In step S3502, the read/write program 1105 references the Dir management table 1009 and the SS-Mapping management table 1010, and obtains an address in the SS-VDEV at the reference destination in accordance with the address in the PVOL/snapshot, which is obtained in step S3500. In this instance, if the size of the target data specified by the read request is larger than the management unit of the SS-Mapping management table 1010, all entries are referenced to obtain the address in the SS-VDEV.

Next, in step S3503, the read/write program 1105 references the Dir management table 1009 and the CR-Mapping management table 1012, and obtains an address in the CR-VDEV or Dedup-VDEV in accordance with the address in the SS-VDEV, which is obtained in step S3502.

Next, in step S3504, the read/write program 1105 determines whether the reference destination address obtained in step S3503 is related to the Dedup-VDEV. More specifically, the reference destination CR-VDEV #2303 in the CR-Mapping management table 1012 is obtained, and then the CR-VDEV management table 1002 is referenced to identify the VDEV #1301 that agrees with the reference destination CR-VDEV #2303 and with the CR-VDEV #1302. If the result of determination in step S3504 is false ("NO" at step S3504), the read/write program 1105 proceeds to step S3506. Meanwhile, if the result of determination in step S3504 is true ("YES" at step S3504), the read/write program 1105 references the Dir management table 1009 and the CR-Mapping management table 1012 in accordance with the address in the Dedup-VDEV, which is identified in step S3503, and obtains an address in CR-VDEV (step S3505).

Next, the read/write program 1105 runs so that the data stored at the address in the CR-VDEV, which is identified in step S3503 or S3505, is decompressed and staged in a cache memory.

Next, the read/write program 1105 determines whether all data within the range specified by the host device is read out into the cache (step S3507). If the result of determination is true, the read/write program 1105 proceeds to step S3508, transfers the data cache hit in step S3501 or the data staged in step S3506 to the host device, and ends the process.

Meanwhile, if the result obtained in step S3507 is false ("NO" at step S3507), the read/write program 1105 returns to step S3502, and restages the data missing from the cache. As described above, in a case where the data within the range specified by the host is stored in contiguous areas in the CR-VDEV, the entire data can be stored in the cache simply by performing a single staging operation from a drive. However, if the data is stored in a distributed manner in the SS-VDEV, the Dedup-VDEV, or the CR-VDEV, throughput performance degrades because metadata referencing or staging from the drive needs to be performed multiple times.

As described above, the disclosed storage system 201 includes an SSD 220 that is configured as a storage device, and a processor 211 that accesses the storage device. The processor 211 manages a primary volume 10P and a snapshot volume 10S as a snapshot family 9. The primary volume 10P is handled as a read/write target of a host. The snapshot volume 10S is generated from the primary volume 10P. The processor 211 uses a snapshot virtual device 11S, which provides a logical address space associated with the snapshot family 9, as the data storage destination for the primary volume 10P and for the snapshot volume 10S. Upon receiving a write request from the host, the processor 211 switches between an overwrite process and a new allocation process in accordance with the reference made to a write destination address range by the snapshot volume 10S and with the degree of distribution of the write destination address range in the snapshot virtual device 11S. The overwrite process is performed to overwrite an allocated area of the snapshot virtual device 11S. The new allocation process is performed to allocate a new area of the snapshot virtual device 11S to the write destination address range.

Consequently, in the storage system that provides snapshots, high throughput performance can be achieved by optimizing the amount of mapping information updates and the amount of data transfer in accordance with the length of data written by the host and with the status of mapping, and changing the allocation of virtual device areas.

Further, since the RoW method is used for the snapshot function, the snapshot data can be compressed in the same manner as normal data. This makes it possible to achieve high capacity efficiency and reduce the amount of usage of storage media such as flash memory and the amount of power consumed by the storage media. As a result, resources and power can be saved.

Furthermore, the processor 211 performs the above-described overwrite process on the condition that the write destination address range is not referenced by the snapshot volume 10S and has a variance value smaller than the threshold in the snapshot virtual device 11S.

Therefore, it is possible to perform the overwrite process when sufficiently contiguous independent data are written at the write destination, and perform the new allocation process if independent data is not written at the write destination or if independent data is written in a distributed manner in noncontiguous areas.

Moreover, in a case where a plurality of volumes belonging to the same snapshot family 9 have the same data, the disclosed storage system allocates a predetermined area in the snapshot virtual device 11S to the same data to allow the plurality of volumes to reference the predetermined area.

Therefore, data referenced by the snapshots can be efficiently managed.

Additionally, in a case where a plurality of volumes belonging to different snapshot families 9 have the same data, the disclosed storage system allocates a predetermined area in a deduplication virtual device 11D referenced by the snapshot virtual device 11S to the same data.

Therefore, duplicate data can be efficiently managed.

Further, the processor 211 includes information regarding the generation of a snapshot in the mapping information that manages the correspondence between an address in a volume belonging to the snapshot family 9 and an area in the snapshot virtual device 11S, and then performs the new allocation process if the generation of the write destination address range disagrees with the latest generation.

Therefore, it is possible to efficiently manage whether independent data is written at the write destination.

Furthermore, in a case where the write destination address range is not referenced by the snapshot volume 10S and has a variance value equal to or greater than the threshold in the snapshot virtual device 11S, the processor 211 determines whether an area necessary for the new allocation process exists in the snapshot virtual device 11S. If the necessary area exists, the processor 211 performs the allocation. Meanwhile, if the necessary area does not exist, the processor 211 expands the snapshot virtual device 11S and then performs the new allocation process.

Therefore, it is possible to perform efficient memory operations while expanding the snapshot virtual device 11S as needed.

Moreover, the processor 211 provides a compression append virtual device 11C between the snapshot virtual device 11S and the storage device, compresses data specified by the write request, and writes the resulting compressed data into the storage device.

Therefore, the storage system configured to compress and manage data is able to efficiently use virtual device resources and achieve high throughput.

It should be noted that the present invention is not limited to the foregoing embodiment, but extends to various modifications. For example, the foregoing embodiment is described in detail to explain the present invention in an easy-to-understand manner, and is not necessarily limited to a configuration including all component elements described above. Further, it is possible to not only delete the component elements but also replace the component elements or add new ones.

What is claimed is:

1. A storage system comprising:

a storage device; and a processor that accesses the storage device, wherein the processor manages a primary volume and a snapshot volume as a snapshot family, the primary volume being handled as a read/write target of a host, the snapshot volume being generated from the primary volume;

wherein the processor uses a snapshot virtual device as the data storage destination for the primary volume and for the snapshot volume, the snapshot virtual device being configured to provide a logical address space associated with the snapshot family; and wherein, upon receiving a write request from the host, the processor switches between an overwrite process and a new allocation process in accordance with the reference made to a write destination address range by the snapshot volume and with the degree of distribution of the write destination address range in the snapshot virtual device, the overwrite process being performed to overwrite an allocated area of the snapshot virtual device, the new allocation process being performed to allocate a new area of the snapshot virtual device to the write destination address range.

2. The storage system according to claim 1,
wherein the processor performs the overwrite process on the condition that the write destination address range is not referenced by the snapshot volume and has a variance value smaller than a threshold in the snapshot virtual device.

3. The storage system according to claim 1,
wherein, when a plurality of volumes belonging to the same snapshot family have the same data, the storage system allocates a predetermined area in the snapshot virtual device to the same data to allow the plurality of volumes to reference the predetermined area.

4. The storage system according to claim 1,
wherein, when a plurality of volumes belonging to different snapshot families have the same data, the storage system allocates a predetermined area in a deduplication virtual device referenced by the snapshot virtual device to the same data.

5. The storage system according to claim 1,
wherein the processor
includes information regarding the generation of a snapshot in mapping information that manages the correspondence between an address in a volume belonging to the snapshot family and an area in the snapshot virtual device, and
performs the new allocation process if the generation of the write destination address range disagrees with the latest generation.

6. The storage system according to claim 2,
wherein, when the write destination address range is not referenced by the snapshot volume and has a variance value equal to or greater than a threshold in the snapshot virtual device, the processor determines whether an area necessary for the new allocation process exists in the snapshot virtual device, and performs the allocation if the necessary area exists, or performs the new allocation process after expanding the snapshot virtual device if the necessary area does not exist.

7. The storage system according to claim 1,
wherein the processor
provides a compression append virtual device between the snapshot virtual device and the storage device,
compresses data specified by the write request, and
writes the resulting compressed data into the storage device.

8. A data processing method adopted by a storage system that includes a storage device and a processor, the processor being configured to access the storage device,
the data processing method includes the steps of:
causing the processor to manage a primary volume and a snapshot volume as a snapshot family, the primary volume being handled as a read/write target of a host, the snapshot volume being generated from the primary volume;
causing the processor to use a snapshot virtual device as the data storage destination for the primary volume and for the snapshot volume, the snapshot virtual device being configured to provide a logical address space associated with the snapshot family; and
when a write request is received from the host, causing the processor to switch between an overwrite process and a new allocation process in accordance with the reference made to a write destination address range by the snapshot volume and with the degree of distribution of the write destination address range in the snapshot virtual device, the overwrite process being performed to overwrite an allocated area of the snapshot virtual device, the new allocation process being performed to allocate a new area of the snapshot virtual device to the write destination address range.

* * * * *